(12) United States Patent
Maren

(10) Patent No.: US 7,421,419 B2
(45) Date of Patent: Sep. 2, 2008

(54) SYSTEM AND METHOD FOR EVIDENCE ACCUMULATION AND HYPOTHESIS GENERATION

(75) Inventor: Alianna J. Maren, McLean, VA (US)

(73) Assignee: Viziant Corporation, McLean, VA (US)

(*) Notice: Subject to any disclaimer, the term of this patent is extended or adjusted under 35 U.S.C. 154(b) by 184 days.

(21) Appl. No.: 11/279,465

(22) Filed: Apr. 12, 2006

(65) Prior Publication Data

US 2007/0005523 A1     Jan. 4, 2007

Related U.S. Application Data

(60) Provisional application No. 60/670,225, filed on Apr. 12, 2005, provisional application No. 60/673,366, filed on Apr. 21, 2005.

(51) Int. Cl.
*G06F 9/44* (2006.01)
*G06N 7/02* (2006.01)
*G06N 7/06* (2006.01)

(52) U.S. Cl. ........................................ 706/52

(58) Field of Classification Search ................ None
See application file for complete search history.

(56) References Cited

U.S. PATENT DOCUMENTS

| | | | |
|---|---|---|---|
| 4,874,963 A | 10/1989 | Alspector | |
| 5,383,120 A | 1/1995 | Zernik | |
| 5,444,819 A | 8/1995 | Negishi | |
| 5,461,699 A | 10/1995 | Arbabi et al. | |
| 5,589,622 A | 12/1996 | Gurr et al. | |
| 5,721,910 A | 2/1998 | Unger et al. | |
| 5,761,442 A | 6/1998 | Barr et al. | |
| 5,867,799 A | 2/1999 | Lang et al. | |
| 5,875,108 A * | 2/1999 | Hoffberg et al. | ............. 700/17 |

(Continued)

FOREIGN PATENT DOCUMENTS

EP     1 107 157 A2     6/2001

OTHER PUBLICATIONS

Qual+Quant=? Integrating the Social with the Technical in a Regulatory Evidence Base Jones, M.; Technology and Society, 2007. ISTAS 2007. IEEE International Symposium on Jun. 1-2, 2007 pp. 1-8 Digital Object Identifier 10.1109/ISTAS.2007.4362220.*

(Continued)

*Primary Examiner*—Michael B Holmes
(74) *Attorney, Agent, or Firm*—Paul, Hastings, Janofsky & Walker LLP

(57) ABSTRACT

A methodology, a system, and an apparatus is defined for performing evidence-based decision-making about matching a given entity against one or more of a set of known or reference entities. A satisfactory decision is achieved as a function of both potentiality and plausibility, where plausibility refers to the full set of values garnered by the evidence accumulation process in the process of generating belief/disbelief/uncertainty/conflict masses. Potentiality is a mechanism to set the various match threshold values, where the thresholds define acceptable confidence levels for decision-making. Evidence is computed on the basis of partial matching of feature vector elements, where separate and distinct feature vectors are associated with both the given entity and each of the reference entities. Following evidence-combination methods, evidence is accrued for both the positive and negative decisions regarding a potential match.

38 Claims, 12 Drawing Sheets

U.S. PATENT DOCUMENTS

| | | | |
|---|---|---|---|
| 5,920,477 | A * | 7/1999 | Hoffberg et al. ............ 382/181 |
| 5,933,818 | A | 8/1999 | Kasravi et al. |
| 6,056,690 | A | 5/2000 | Roberts |
| 6,112,194 | A | 8/2000 | Bigus |
| 6,300,957 | B1 | 10/2001 | Rao et al. |
| 6,317,700 | B1 * | 11/2001 | Bagne ........................ 702/181 |
| 6,377,259 | B1 | 4/2002 | Tenev et al. |
| 6,411,962 | B1 | 6/2002 | Kupiec |
| 6,463,433 | B1 | 10/2002 | Baclawski |
| 6,529,603 | B1 | 3/2003 | Palmer |
| 6,578,022 | B1 | 6/2003 | Foulger et al. |
| 6,611,841 | B1 | 8/2003 | Han |
| 6,628,312 | B1 | 9/2003 | Rao et al. |
| 6,654,761 | B2 | 11/2003 | Tenev et al. |
| 6,665,681 | B1 | 12/2003 | Vogel |
| 6,668,256 | B1 | 12/2003 | Lynch |
| 6,951,008 | B2 * | 9/2005 | Quaile ......................... 706/54 |
| 6,978,274 | B1 | 12/2005 | Gallivan et al. |
| 7,076,437 | B1 * | 7/2006 | Levy ............................. 705/3 |
| 7,127,355 | B2 * | 10/2006 | Cox et al. ..................... 702/20 |
| 7,136,710 | B1 * | 11/2006 | Hoffberg et al. ............. 700/83 |
| 7,194,301 | B2 * | 3/2007 | Jenkins et al. ................. 607/2 |
| 7,268,109 | B2 * | 9/2007 | Ellis et al. ...................... 514/2 |
| 7,307,543 | B2 * | 12/2007 | Rosenfeld et al. ...... 340/870.01 |
| 7,309,314 | B2 * | 12/2007 | Grant et al. ................. 600/529 |
| 7,321,862 | B2 * | 1/2008 | Rosenfeld et al. ............. 705/3 |
| 7,389,281 | B2 * | 6/2008 | Strobel Stewart et al. ..... 706/52 |
| 2002/0007373 | A1 | 1/2002 | Blair et al. |
| 2003/0014428 | A1 | 1/2003 | Mascarenhas |
| 2003/0128998 | A1 | 7/2003 | Nishi |
| 2003/0163302 | A1 | 8/2003 | Yin |
| 2003/0212675 | A1 | 11/2003 | Denesuk et al. |
| 2003/0220860 | A1 | 11/2003 | Heytens et al. |
| 2004/0172378 | A1 | 9/2004 | Shanahan et al. |
| 2004/0267566 | A1 * | 12/2004 | Badgett et al. .................. 705/2 |
| 2005/0071328 | A1 | 3/2005 | Lawrence |
| 2005/0149494 | A1 | 7/2005 | Lindh et al. |
| 2005/0222989 | A1 | 10/2005 | Haveliwala et al. |
| 2005/0240580 | A1 | 10/2005 | Zamir et al. |

OTHER PUBLICATIONS

Evidence-based software engineering for practitioners Dyba, T.; Kitchenham, B.A.; Jorgensen, M.; Software, IEEE vol. 22, Issue 1, Jan.-Feb. 2005 pp. 58-65 Digital Object Identifier 10.1109/MS.2005.6.*

A framework for dynamic evidence based medicine using data mining Masuda, G.; Sakamoto, N.; Computer-Based Medical Systems, 2002. (CBMS 2002). Proceedings of the 15th IEEE Symposium on Jun. 4-7, 2002 pp. 117-122 Digital Object Identifier 10.1109/CBMS.2002.1011364.*

Incorporation of evidences into an intelligent computational argumentation network for a web-based collaborative engineering design systemXiaoqing Liu,; Khudkhudia, Ekta; Ming Leu,; Collaborative Technologies and Systems, 2008. CTS 2008. International Symposium on May 19-23, 2008 pp. 376-382 Digital Object Identifier 10.1109/CTS.2008.4543954.*

Safety and Dependability Analysis of Self-Adaptive Systems Gudemann, M.; Ortmeier, F.; Reif, W.; Leveraging Applications of Formal Methods, Verification and Validation, 2006. ISoLA 2006. Second International Symposium on Nov. 15-19, 2006 pp. 177-184 Digital Object Identifier 10.1109/ISoLA.2006.38.*

A decision support system for breast cancer treatment based on data mining technologies and clinical practice guidelines Skevofilakasa, M.T.; Nikitaa, K.S.; P.H. Templaleksis; K.N. Birbas; I.G. Kaklamanos; G.N. Bonatsos; Engineering in Medicine and Biology Society, 2005. IEEE-EMBS 2005. 27th Annual International Conference of the 2005 pp. 2429.*

Development of an evidence-based ethical decision-making tool for neonatal intensive care medicine Frize, M.; Walker, R.C.; Ennett, C.M.; Engineering in Medicine and Biology Society, 2003. Proceedings of the 25th Annual International Conference of the IEEE vol. 2, Sep. 17-21, 2003 pp. 1260-1263 vol. 2 Digital Object Identifier 10.1109/IEMB.*

Towards evidence-based trust brokering Dong Huang; Bracher, S.; Security and Privacy for Emerging Areas in Communication Networks, 2005. Workshop of the 1st International Conference on Sep. 5-9, 2005 pp. 43-50 Digital Object Identifier 10.1109/SECCMW.2005.1588295.*

Constructing New Drug Adoption Rules in Medical Institution Ching-Hsue Cheng; Jr-Shian Chen; Jia-Wen Wang; Machine Learning and Cybernetics, 2007 International Conference on vol. 3, Aug. 19-22, 2007 pp. 1359-1364 Digital Object Identifier 10.1109/ICMLC.2007.4370356.*

Fusion of open source information Noble, D.F.; Information Fusion, 2005 8th International Conference on vol. 2, Jul. 25-28, 2005 pp. 8 pp. Digital Object Identifier 10.1109/ICIF.2005.1592015.*

Delivering a Lifelong Integrated Electronic Health Record Based on a Service Oriented Architecture Katehakis, D.G.; Sfakianakis, S.G.; Kavlentakis, G.; Anthoulakis, D.N.; Tsiknakis, M.; Information Technology in Biomedicine, IEEE Transactions on vol. 11, Issue 6, Nov. 2007 pp. 639-650 Digital Object Identifier 10.1109/TITB.2006.889711.*

Soup or Art? The role of evidential force in empirical software engineering Pfleeger, S.L.; Software, IEEE vol. 22, Issue 1, Jan.-Feb. 2005 pp. 66-73 Digital Object Identifier 10.1109/MS.2005.19.*

Classification of pathology data using a probabilistic (Bayesian) model Robin, H.; Eberhardt, J.S., III; Muller, W.D.; Clark, R.; Kam, J.; Systems Engineering, 2005. ICSEng 2005. 18th International Conference on Aug. 16-18, 2005 pp. 286-291 Digital Object Identifier 10.1109/ICSENG.2005.22.*

Minitrack: Consumer Health Informatics, Patient Safety and Quality of Practice Lerouge, C.; Culjak, G.; Horan, T.A.; System Sciences, 2007. HICSS 2007. 40th Annual Hawaii International Conference on Jan. 2007 pp. 133-133 Digital Object Identifier 10.1109/HICSS.2007.358.*

Development of a hand-held real-time decision support aid for critical care nursing Fortier, P.; Jagannathan, S.; Michel, H.; Dluhy, N.; Oneill, E.; System Sciences, 2003. Proceedings of the 36th Annual Hawaii International Conference on Jan. 6-9, 2003 pp. 9 pp. Digital Object Identifier 10.1109/HICSS.2003.1174355.*

The use of major risk factors for computer-based distinction of diabetic patients with ischemic stroke and without stroke Merey, S.O.; Gurgen, F.; Gurgen, N.; Engineering in Medicine and Biology Society, 2001. Proceedings of the 23rd Annual International Conference of the IEEE vol. 4, Oct. 25-28, 2001 pp. 3839-3843 vol. 4.*

Sentz et al., "Combination of Evidence in Dempster-Shafer Theory," Sandia Report—Sandia National Laboratories, California, Apr. 30, 2002.

U.S. Appl. No. 10/877,776, filed Jun. 2004, Google, Inc.

Inxight White Paper by Catherine van Zuyen: From Documents to Information: A New Model for Information Retrieval, Inxight Software, Inc., Oct. 2004, (18 pages).

Inxight White Paper: Inxight SmartDiscovery: Discover the True Value of Information, Inxight Software, Inc., Jun. 2003, (13 pages).

Inxight White Paper: Inxight SmartDiscovery Product Data Sheet: The Complete Solution for Enterprise Information Discovery, Inxight Software, Inc., (4 pages), date unknown.

Zhang, Byoung-Tak et al., "Personalized Web-Document Filtering Using Reinforcement Learning", Applied Artificial Intelligence, 2001, 17 pages.

* cited by examiner

Figure 10

|  |  | Evidence Values | |
|---|---|---|---|
|  |  | Positive Belief Evidence | Non-Belief Evidence |
| Evidence Masses | Support Belief in assertion ("Y" = Yes) | $Y$ | $0.0$ |
|  | Uncertain ("U") | $U$ | $U$ |
|  | Support Belief that assertion is invalid ("N" = No) | $1-Y-U$ | $1-U$ |

SYSTEM AND METHOD FOR EVIDENCE ACCUMULATION AND HYPOTHESIS GENERATION

CROSS-REFERENCE TO RELATED PATENT APPLICATIONS

This application claims the benefit of and priority to U.S. Provisional Patent Application No. 60/670,225 filed Apr. 12, 2005 and U.S. Provisional Patent Application No. 60/673,366 filed Apr. 21, 2005, both of which are herein incorporated by reference.

SUMMARY

According to one embodiment of the invention, a system for performing evidence-based decision-making comprises an evidence processor, configured to match an extracted entity against a set of reference entities; an evidence selection processor for defining a rule set to be applied to the extracted entity and the plurality of reference entities and configured to generate a total evidence function; a threshold processor configured to generate a context-dependent threshold for an acceptable decision and a decision processor, configured to compare the total evidence function to the context-dependent threshold and determine whether to accumulate and aggregate further evidence or to generate a decision-result.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 10 is a table showing evidence mass distribution for two evidence values according to one embodiment of the invention.

DESCRIPTION

Figure 1:
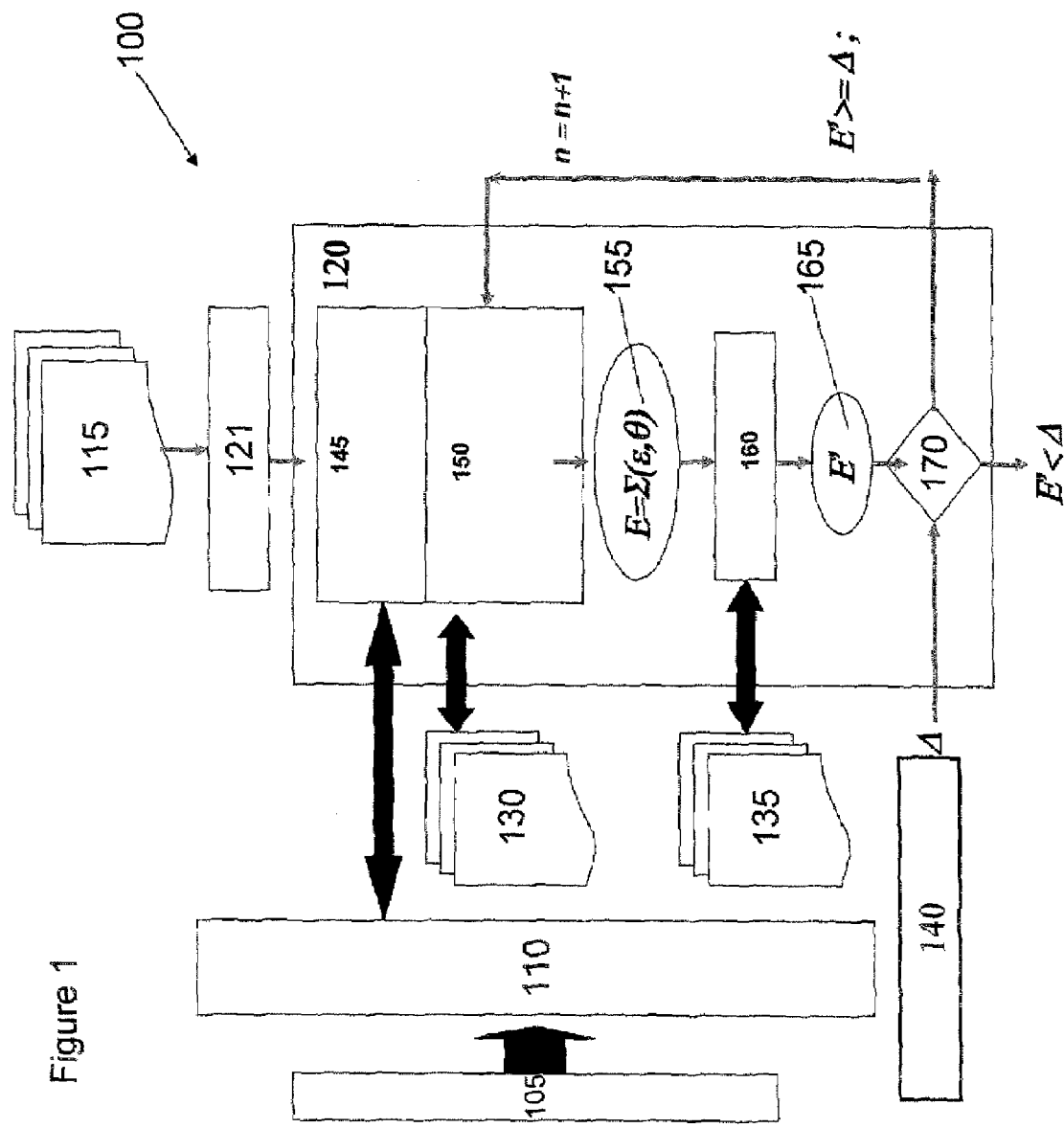
FIG. 1 is a block diagram of a system for performing evidence-based decision-making according to one embodiment of the invention.

Embodiments of the present invention will be described below. It should be understood that the following description is intended to describe exemplary embodiments of the invention, and not to limit the invention.

This application defines a methodology, a system, and an apparatus for performing evidence-based decision-making about matching a given entity against one or more of a set of known or reference entities. A satisfactory decision is achieved as a function of both potentiality and plausibility, where plausibility, although technically describing just one element in the belief value set, refers to the full set of values garnered by the evidence accumulation process in the process of generating belief/disbelief/uncertainty/conflict masses. Potentiality is a mechanism to set the various "match threshold values," where the thresholds define acceptable confidence levels for decision-making. Evidence is computed on the basis of partial matching of feature vector elements, where separate and distinct feature vectors are associated with both the given entity and each of the reference entities. Further, the feature vectors need not be initially fully populated, but additional feature vector element values can be obtained as the decision-making process requires. Following evidence-combination methods (e.g., those used in Dempster-Shafer formalisms), evidence is accrued for both the positive and negative decisions regarding a potential match.

The challenges which this invention addresses include decision-making situations where it is substantially preferable to generate a large number of hypotheses, and both "validate" and "refute" these hypotheses, until a final decision can be made. This invention is particularly useful for those cases where it is exceptionally important to minimize "false negatives." Indeed, in many circumstances, a large number of initial "false positives" can be tolerated (followed by subsequent more detailed analysis and determinations), rather than allow any "false negatives" to escape. Examples of such cases include security screening for passengers on an aircraft, medical profile screening such as cancer cell/tumor detection, etc.

Similarly, this invention is useful when a large number of possible determinations or associations can be made regarding an entity, e.g., determining which "real, extant person" (or reference entity) is referred to when a person's name (or extracted entity) is taken from some document or other data source. Here, there is again a need to posit many possible alternative matches; e.g., initially to all reference entities who have matching or even similar names. The task, similar to the one just described, is to advance multiple candidate hypotheses, and to prove or disprove each, until a very small number (preferably a single hypothesis) remains as the most likely match.

The process of proving (validating) or disproving (refuting) any number of hypotheses is impacted by several factors. This is not a simple classification task. In a classification task, the number of particular classes is typically well-known, and typically much smaller than the number of candidate entities that would be matched to a given class type. Because classes can be described by combinations of "characteristic attributes," classification tasks can typically be performed by one of a number of well-known methods, e.g., Bayesian classifiers, neural networks, etc. However, this invention addresses the case of matching particulars—e.g., a given extracted entity (say, a person's name) against a large set of reference entities (known persons). In this case, each reference entity is characterized uniquely by a set of particulars, not as a member of a given class. This means that a methodology other than that typically employed for classification tasks will be required.

According to one embodiment of the invention, all the thresholds for making an acceptable decision are context-dependent. Frequently, there will be costs associated with reaching certain levels of confidence or belief in a given decision. Depending on the quality of available data, the number of competing hypotheses, the extent to which these hypotheses can be readily distinguished from each other based on the readily available data, and other factors, it may at times be more "costly" to achieve greater confidence levels in either or both validating and/or refuting any of the set of potential hypotheses. It may at times be possible to refute certain critical hypotheses more readily than it may be possible to validate a positive assertion. In all of these cases, the question of setting thresholds for an acceptable decision becomes paramount, as cost factors can rise rapidly as decision confidence requirements are increased. Thus, it is essential to have a means for making context-dependent thresholds for "acceptable decisions." This challenge is addressed within this invention.

This means that the hypothesis validation/refutation methods must have at least the following. An evidence accumulation method or system for incrementally aggregating information until a satisfactory decision can be reached, where this method should yield both degrees of validation and refutation for any given hypothesis, as well as to indicate when an aggregated evidence combination BOTH validates and refutes a given hypothesis, or suggests "conflict" about the hypothesis.

An ability to deal with partially complete and/or partially erroneous evidence, as part of the evidence accumulation method, both associated with the extracted entity and also with the reference entities to which the extracted entity will be compared for hypothesis resolution.

An evidence selection method or system for selecting the "next best" type of evidence to both access and aggregate in order to form the next step of aggregated evidence that serves to either validate or refute a hypothesis, where the means for such selection needs to address both the potential "maximal usefulness" that a given piece of evidence could provide as well as its potential cost, together with the likelihood that even if acquired, it could possibly be erroneous or incomplete.

As one example, this invention addresses the case where an entity (person, organization, place, object, or even, in some cases, an event) is extracted from text-based data sources. There are already many methods and capabilities for performing this task, and for purposes of this invention, they will be assumed to provide an acceptable set of extracted entities which may further already be identified, using one or more of several means known to practitioners of the art, as being a person, place, thing, etc. Further, without loss of generality, the challenge addressed by this invention is independent of the data source from which the entity is extracted; the sourcing data may be structured or unstructured. In the case of structured data, there is often a set of feature vector elements associated with the entity; e.g., in the case of a list of persons, there can also be associated information such as address and phone number. In the case of unstructured data, it is also often possible to create a "context vector" containing both words and other extracted entities which can be useful for identifying a given extracted entity in the context of either or both a situation or reference frame as well as other specific extracted entities.

The present invention defines an acceptable methodology for accumulating evidence with regard to decision-making corresponding to a particular assertion, e.g., entity matching. The challenges which one embodiment of the present invention addresses are those decision-making situations where it is substantially preferable to generate a large number of hypotheses, and both "validate" and "refute" these hypotheses, until a final decision can be made. This invention is particularly useful for those cases where it is exceptionally important to minimize "false negatives." Indeed, in many circumstances, a large number of initial "false positives" can be tolerated (followed by subsequent more detailed analysis and determinations), rather than allow any "false negatives" to escape. Examples of such cases include security screening for passengers on an aircraft, medical profile screening such as cancer cell/tumor detection, etc.

This invention addresses the challenges previously identified with a decision-making methodology, architecture, and system that includes at least three components of invention: (1) a system for generating multiple candidate hypotheses, each of which are to be validated and/or refuted, until minimally few hypotheses remain as viable candidates, (2) a system for determining context-based evidence accumulation thresholds corresponding to "acceptable decisions" regarding candidate hypotheses, along with (3) a system for evidence selection and aggregation, in support of the hypotheses validation and refutation tasks.

The means for generating candidate hypotheses is largely governed by the particular situation to which the decision-making method, architecture, and system will be applied. The goal of hypothesis validation is, in this application, typically to provide sufficient evidence to positively make a given assertion. A common application will be to determine correct association between an "extracted entity" and one out of a set of "reference entities." This process will typically continue until a positive match has been made.

Illustrative, although by no means limiting, examples include the following: A person purchases a plane ticket, and gives certain identifying information, How can we verify that the "identifying information" supplied by and about this person sufficiently and matches some known person (the "reference entity") and can be judged not to match other possible "reference entities?"

In another example, a person desires entry into a building, and again provides identifying information. This is similar to the example above, and the process of identify verification can be largely similar. However, special considerations may involve (i) information provided by the person, or available about the person from known commercial or open data sources, (ii) special or unique considerations regarding the person and interests of the building which can require more customized profiling of either or both the person and/or the building, In a further example an "entity" extracted from an open source data source is identified as a "person," and is being matched against a list of "persons of interest" in a reference database of known persons for any number of reasons, ranging from political to marketing. What is the process by which the extracted entity can be uniquely associated with a reference entity to an acceptable degree of confidence, and simultaneously, other possible associations refuted—again with acceptable confidence?

The goal of hypothesis refutation is to minimize the number of false negatives resulting from making a given assertion, e.g., with regard to extracted entity evaluation. Thus, it is sometimes more important to ascertain that a given extracted entity is not a match to certain reference-list entities than it is to positively match the same extracted entity to a reference entity.

In the case of the first example above, once a person has been associated to some known reference entity (e.g., using one or more commercial data sources), how then do we disprove that the same person is not one of the persons on a "watch list?"

In the case of the second example above, watch-list matching, it is possible that not only should the person be screened against (i) known watch-list persons, but also (ii) their potential for "non-obvious relationships" to persons on an "access-denied" list for that particular facility.

Refuting a match between an extracted entity and a key reference entity is important in determining the significance of material associated with the extracted entity. In the third example above, if the extracted entity is matched to a well-known reference political entity, and the extracted entity is associated with making a position statement, then there would be more impact than if the extracted entity has relatively little influence. Similarly, if the extracted entity were a well-known celebrity and was making a marketing statement, that would again imply more impact than if the person did not have commercial impact, In either of these cases, if the goal is to identify political or marketing impacts, it is more important to refute the match (or to confirm that the match is to the well-known person) than it is to positively match the extracted entity (person) to some other individual.

The case of hypothesis refutation (e.g, of "watch list matching) requires advancing match hypotheses to potentially multiple candidates drawn from some reference list of persons (which may be a watch list or "access denied" list). The goal here is to advance a large number of candidate hypotheses, thereby generating a very large pool of potential "positive candidates," and then to disprove these matches.

The decision-making processes here are typically of two interwoven types. Both the tasks of hypothesis verification and hypothesis refutation require an evidence-aggregation and evaluation methodology and system. This methodology and system should produce sufficient evidence that the person matches to a known reference person with some degree of fidelity. It should also ensure that there is minimal conflict (i.e., disbelief that the proposed match is good, and/or contradictory positive beliefs that the person is a strong match to some other reference person). Also, for both hypothesis validation and refutation, the hypotheses advanced are potential match-candidates among the reference persons (typically from a stored database of such persons).

The difference between hypothesis validation and hypothesis refutation is that the goal of hypothesis validation is to garner sufficient evidence to support a given (identity-verifying) match. The process should involve not only gathering evidential support, but also (i) ensuring that there are no substantive disbeliefs in the proposed verification, and (ii) there are no significant conflicts introduced by matches to other persons referenced in the data source. The process of hypothesis refutation similarly garners sufficient evidence to support disbelief in a match, preferably with minimal belief and conflict.

The scope of this invention is not only to address the decision-making process in terms of specific accrued evidence about a given assertion, which can typically be a person, thing, or event, but also to place the decision in the context of variables influencing the decision-making process. As an example, a person with a certain degree of verified identity might be allowed to take a plane flight from one city to another if the threat associated with each of the two cities is low, but be required to provide further information if the flight is to a city where the President is meeting with other heads of state. Similarly, a person might be sought for debt repayment if they are residing in a state where the fees for filing for debt claim are sufficiently low, and if there is enough time for the debt pursuit process to be activated and yield some success. Conversely, a different person with similar debt and other personal factors, but living in a different state or having a different time window, might be judged not worth the effort for debt claim. Thus, the final degree of effort required to obtain high confidence on that person's identity might not be warranted, if initial and plausible information indicates that the likely return on effort is not likely to be worthwhile.

Thus, this invention defines a method, architecture, and system by which context-dependent critical decision thresholds can be achieved, i.e., formulating a means by which critical decision thresholds can be modified as a set of one or more external events or parameters, thus yielding context-dependent decision criteria, as a function of both plausibility and potentiality, which are defined herein.

In order to fulfill the related goals of hypothesis validation and refutation, evidence needs to be gathered and aggregated in support of each candidate hypothesis.

The approach taken in this invention addresses those cases where various "entities" can be described by means of feature vectors, where the feature vectors can take on population of additional, pre-specified data fields as need for additional evidence arises. Note that not all fields are filled at the beginning of the decision-making task, nor must all the fields necessarily be filled in order for a satisfactory decision to be reached.

The tasks to which this methodology will be applied will involve the following constraints: The a priori probability distribution of the feature vector values may be unknown, and a priori dependence of the extracted entity association to a reference identity, resting on a given set of feature vector values, may be difficult to compute, and the number of possible competing hypotheses, and the effort needed to distinguish an acceptable match to a specific hypothesis (verifying one hypothesis and refuting others), can be very difficult to specify in advance.

Further, the following objectives should be satisfied such as evidence accumulation should be traceable, different kinds of evidence can be associated with both the extracted entities and the reference entities, so that no single "path" for evidence matching will always be available; instead, multiple evidence combinations may not only be possible but necessary, evidence items (feature vector elements) associated with either or both the extracted entities and/or the reference entities may be partial or incomplete, and yet partial matches between these evidence items should contribute some degree of evidence accumulation, both uncertainty and conflict in potential decisions/assignments should be represented explicitly, there should be a defined means for accumulating additional evidence to support potential assertions, so that a "minimal-cost" set of rules for obtaining evidence can be applied (assuming that each "evidence unit" carries an associated cost), and there should be a means to cut-off further evidence accrual after sufficient evidence has been obtained to support a given assertion, while the uncertainty and/or conflict about this assertion are within acceptable and defined limits.

The process of generating multiple hypotheses and then refuting certain hypotheses via "defeasible reasoning" (i.e., "defeating" a hypothesis) has been established for some time. This invention postulates a rule-based method for generating hypotheses based on preliminary information that can be ascertained either with regard to the initial assertion(s), and then gathering sufficient evidence to refute the majority of the hypotheses, while simultaneously proving or "validating" the hypothesis that is most correct.

It is more interesting to make a decision using Dempster-Shafer (D-S) outputs than it is with a simpler classifier. The D-S process produces a belief-set output for each iteration of the D-S process (each successive step of pairwise evidence aggregation). This belief-set consists of the various initial and resultant evidence valuations (belief, disbelief, and uncertainty, along with plausibility, or belief+uncertainty, and doubt, or disbelief+uncertainty). In addition, a conflict value can be produced after two or more evidence items are combined. This measures the disparity between the belief that one evidence source might assert against the disbelief asserted by a different form of evidence. Thus, instead of having a scalar confidence value (as is produced with most classification schemes), we have a set of four distinct values (belief, disbelief, uncertainty, and conflict), along with two others that are additive combinations of certain distinct values. This means that decision criteria are potentially more complex.

The goal of using the D-S method is to provide support for a decision. That decision should rightly be made in the context of several different factors, ranging from global to local, and with regard to the entity in question, potential classifications or matches of the entity, and considerations of both potential past as well as future history. In short, the decision-making process that the D-S method supports should not be static. Rather, decisions should be made in context. It is to this end that the first aspect of this invention is specifically addressed.

This question is phrased in terms of making decisions in the context of both plausibility (for a match, classification, or other decision) as embedded in the framework of potentiality, which is the set of overarching constraints describing the considerations involved in applying a decision.

Ideally, the decision to positively classify an entity as being a match to a reference entity would be the result of having sufficiently high belief (Belief>$\Delta_1$), a sufficiently low disbelief (or sufficiently high plausibility, which amounts to the same thing), and a sufficiently low conflict (between belief/disbelief as asserted by different evidence sources.)

The set of thresholds $\Delta_i$, i=1 . . . n, where n is the total number of decision thresholds used, needs to be defined in context of situations and events that are typically too broadly scoped to directly be part of the evidence aggregation process. That is, context would apply to all decisions made within the scope of a particular context, while evidence is accrued for unique and particular situations occurring within the contextual framework.

The actual values for these thresholds $\Delta_i$ can be determined in multiple ways. A preferred embodiment is to use a combination of independent conditional probabilities, e.g., Bayesian belief networks.

Bayesian belief networks have been well-established, and are suitable for cases where the belief-states about which evidence is being accumulated can vary with time. Bayesian belief networks can also accumulate evidence from multiple sources, represented in a single long feature vector. If certain evidence types are missing, a belief-state classification is still possible based on other evidence. However, as with basic neural networks, this approach lacks good traceability. It is difficult to "reverse engineer" a given classification.

The unique component of this invention is that the outputs of the threshold-determination process, preferentially embodied as a set of Bayesian belief networks, are used as inputs into the decision-making process, as was shown in FIG. 1.

By way of illustration, in the entity identify verification application, the challenge is to associate each extracted entity against a set of potential reference entities, finding those to which a match is possible or even likely, and to identify the possible strength or confidence in the set of plausible matches. Determining a one-to-one correspondence between an extracted entity and a reference entity, or "verifying an identity," is broader than simply obtaining sufficient confidence θ in a given match. Rather, the strength of a given possible match needs to be considered in light of multiple factors, including:

Degree of confidence $\theta_{i,j}$ in a given match between the $i^{th}$ extracted entity to the $j^{th}$ entity in the reference data set, which should at least be greater than some threshold T ($\theta_{i,j} \geqq \theta_T$), Degree to which there is no strong evidence in favor of disbelieving a potential match between extracted entity i and reference entity j, Degrees of confidence between the other k possible matches, $\theta_{i,k}$, k≠j, where $\theta_{i,j} > \theta_{i,k}$ and preferably, $\theta_{i,j} >> \theta_{i,k}$, Degree to which there is an absence of strong conflict between a potential match between extracted entity i and reference entity j (e.g., coming from combinations of strong belief as well as disbelief), Degree to which there is an absence of strong conflict between a potential match between extracted entity i and reference entity j coming from evidence supporting match between extracted entity i and one or more reference entities k, k', etc.

The process of refuting hypotheses requires that a measure of disbelief be generated as well as belief in the leading hypotheses. Also, the leading hypotheses should mature into ones where there is minimal conflict; i.e., no strong indicators of both belief and disbelief Further, when there are multiple competing hypotheses, and multiple small "evidence items" being used to form evidence "masses" in support of various hypotheses, and where there is also high likelihood of partial, incomplete, and even erroneous "evidence items" that will be found and used, there will be a great deal of ambiguity in the early processing stages. Thus, it is very reasonable to work with measures of uncertainty, supporting both plausibility and doubt, as much as to work with the more certain statements regarding belief and disbelief. For these reasons, a Dempster-Shafer formalism is an appropriate starting place for grounding the methods discussed in this invention.

The Dempster-Shafer method is suitable for evidence aggregation within the overall decision-support architecture. This method allows for explicit pairwise combination of beliefs, along with measures of uncertainty and disbelief in a given assertion.

The challenge in using a method such as Dempster-Shiafer (D-S) is that the is that initial belief-set values are not as readily defined in an a priori sense as are the normal distributions used for Bayesian-based classifications. And unlike work with neural networks, which can be trained when there are sufficient examples "spanning" the multiple dimensions for evidence combinations, we are not always assured of complete evidence-space coverage required for good training. In short, we must define means for defining not only initial belief, but also disbelief and uncertainty resulting from any initial evidence form, prior to the evidence aggregation.

Because one of the strengths of the D-S method is that it is intrinsically well-suited for dealing with aggregation of partial or incomplete evidence, we need a method that not only defines the relative initial values of each specific type of evidence, and also the value of "partial" evidence of each type, but also the means by which disbelief is associated with a given evidence-type when belief falls off. This is something that needs to be determined prior to aggregating that particular evidence type with other (either initial and singular, or previously aggregated) evidence. The present invention described here addresses this issue, While the need for a decision tree governing selection of pairwise elements for combination can require development of a substantial rules set to cover all the possible cases for obtaining different evidence combinations, this can actually prove to be an advantage in the sense that each time an evidence-unit is requested from a specific source, it will be possible to pre-compute the additional cost. It will also be possible to specify in advance how much a given additional form of evidence will be allowed to contribute to the total belief. This means that cost/benefit tradeoffs for collecting different forms of evidence from different sources can be assessed, leading to a rules set governing evidence-gathering.

The following formalisms are established:

$Y_A=M(Y)=$Evidence mass (from one evidence source) supporting belief in A, $N_A=M(N)=$Evidence mass (from the same source) supporting belief in not-A, and $U_A=M(U)=$Uncertainty that there is belief in either A or not-A.

In the case where we refer specifically to evidence from a given evidence source $E_i$, we then denote that specific evidence mass as $M_{Ei}(Y)$, $M_{Ei}(N)$, $M_{Ei}(U)$ as appropriate.

In computing a resultant set of values for belief, disbelief, etc., we allow:

$Y_A=M(Y)=$Evidence mass (from combined evidence sources) supporting belief in assertion or hypothesis A, $N_A=M(N)=$Evidence mass (from combined sources) supporting belief in not-A, and $U_A=M(U)=$Uncertainty that there is belief in either A or not-A.

Since the evidence combination process often must be iterated over multiple evidence combinations, we refer to the resultant of the $i^{th}$ combination in belief in hypothesis A as $Y_{A,i}$, $N_{A,i}$, $U_{A,i}$, etc., as needed. For convenience, these subscripts will be dropped in most ensuing calculations, unless needed.

Discussions regarding the Dempster-Shafer approach, vis-à-vis traditional classification methods (eg., Bayesian classifiers, neural network, Bayesian belief networks, etc.) are well known and are commonly available to practitioners in the art.

The apparatus and method described in this invention provides a means to deal with the more complex decision-making process, based on the valuations of a given belief-set. According to one embodiment, this invention addresses at least three unique areas such as a method for performing iterative hypothesis generation, together with hypothesis validation and refutation, under guidance of an appropriate rules set for gathering evidence, along with a method to determine how decisions can be made using a combination of belief values (belief, disbelief, and uncertainty, along with conflict), a method for embedding decision points (thresholds for achieving successful validation or refutation) within a context, termed a potentiality framework, and a mechanism to define initial values for belief, disbelief and uncertainty, for different complete and partial gradations of evidence.

For purposes of illustration, this invention is couched in terms of verifying that a given extracted entity (e.g., a name taken from a document or website, a name presented as part of a personal identification data set, etc.) corresponds to one of a set of reference entities, which for the sake of illustration, would also be persons.

The following discussion, while couched in terms of a specific example application, is understood to present the system and method in its use, and not to limit the scope or generality of the method described.

According to one embodiment of the invention, for each extracted entity (in this case, a person), at least three feature vectors are considered. P=Primary Information, which could in this particular example refer to Personal Information, e.g., name, date of birth (DOB), etc. A=Activity (or Proposed Actions) vector, e.g., information about actions that are proposed by the person or associated with that person, ranging from booking a flight to making a public appearance or statement, etc., and C=Context vector.

To make more specific the example application, consider the case where the persons are passengers who have provided information to airlines in order to book an airline flight. This information is stored as a Passenger Name Record (PNR) for each passenger. For each passenger, the three vectors identified previously would be identified in a more specific context. P=Passenger Information, which could include name, date of birth (DOB), etc., A=Activity (or Proposed Actions) vector, e.g., a specific flight from a given airport to a given destination, on a specific date, etc., and C=Context vector, which includes (for this example) information about how the flight arrangements were made, but not information about the passenger on a personal basis.

The objective for establishing these vectors is to define a set of normative or reference data types. Each vector will be populated by a distinct set of vector elements (VEs). Certain vector elements will be either scalar values within an allowable and defined range for each vector element, or members of a type class. Example range-delimited scalars will be confidence or belief factors, which would typically be set between zero and one, inclusive. Example type classes will include such things as city of origin/destination, airline, aircraft type, etc. In addition, certain vector variables will be strings, e.g., passenger names.

For this vector set, it is understood that not all VEs will be initially populated for each passenger. Rather, the goal is to identify a set of confidence measures associated with each passenger. As the various confidence measures are accrued for each passenger, for each flight, the process will typically involve obtaining "confirming evidence" that can be stored as specific VE values, which can be registered as either a Boolean or scalar values.

Figure 12:
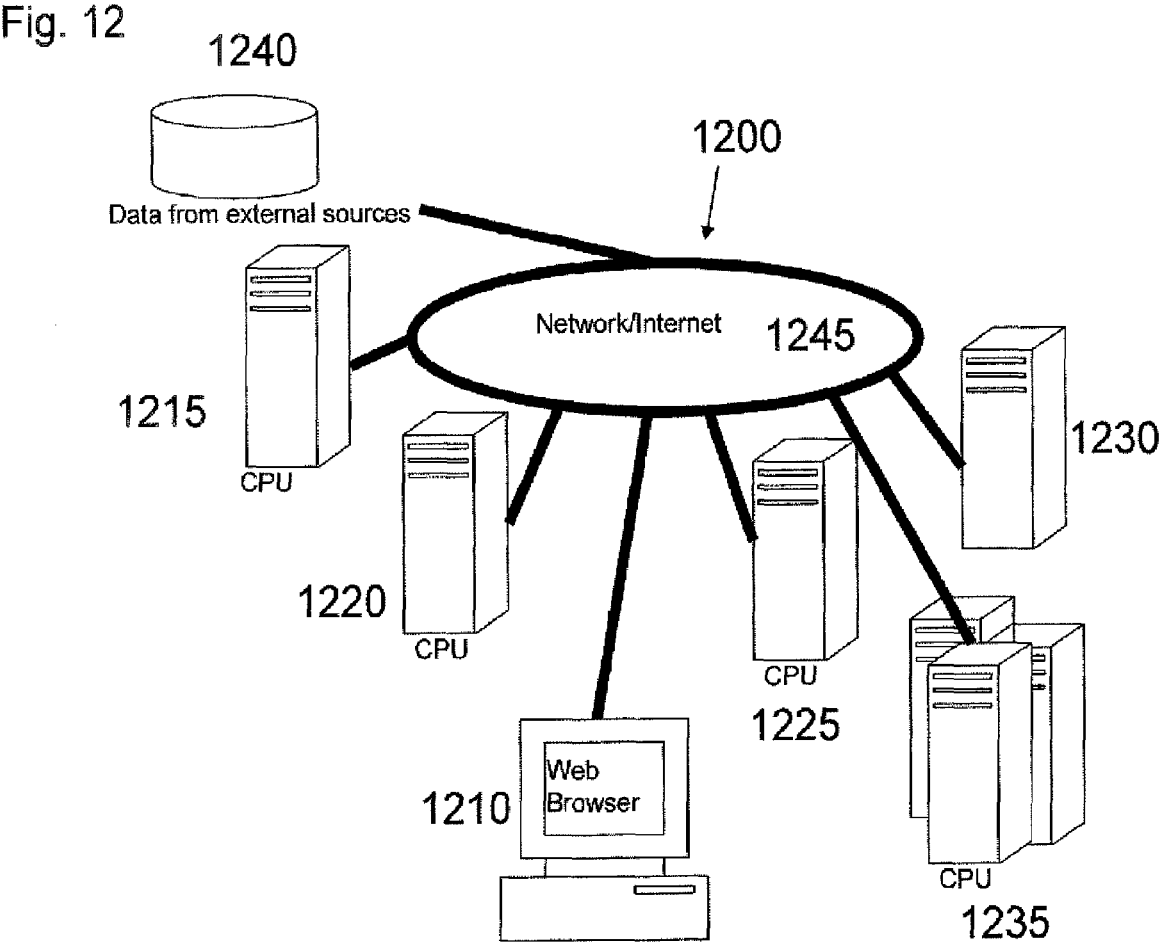
FIG. 12 is a block diagram of a system for performing evidence-based decision-making implemented on a physical computer network according to one embodiment of the invention.

FIG. 1 is a block diagram of a system for performing evidence-based decision-making 100 according to one embodiment of the invention. It should be understood that each component of the system is may be physically embodied by one or more processors, computers, workstations, etc. A physical embodiment of the system, according to one embodiment of the invention, illustrated in FIG. 1, is shown, for example, in FIG. 12, wherein the plurality of components are computers 1215, 1220, 1225, 1230, 1235 and one or more external data sources 1240 interconnected via the internet 1200. A user may access the system via a user terminal 121 that may be configured to run a web browser application.

FIG. 1 shows a set of references entities 105 which are a subset of a set of enhanced reference entities 110. According to one embodiment of the invention, the reference entities and enhanced reference entities are stored in an external data source 1240. As shown in FIG. 1 an extracted entity 115, which is made up of a plurality of feature vectors is inputted into an evidence selection processor 120. The evidence selection processor 120 applies a rule set 121 to the extracted entity 115. The result is input into an evidence processor 125 to accumulate and aggregate acquired evidence. An evidence processor 125 (not shown) facilitates the location, transmission and reception of various data as inputs to the evidence selection processor including the set of enhanced reference entities 110, a first applicable data set 130, a second applicable data set 135 and a context-dependent threshold Δ generated by a threshold processor 140.

The evidence selection processor 125 further includes a hypothesis generator 145, configured to generate hypotheses about the extracted entity 115 and a hypotheses validation processor 150 configures to validate, refute and/or eliminate the generated hypotheses to generate a total evidence function 155. A reconciliation processor 160 is configured to acquires additional evidence and generate a resolved evidence value 165. A decision processor 170 compares the resolved evidence value 165 to a threshold value to determine whether (1) more evidence is needed or (2) a definitive assertion can be made.

For purposes of illustration, and to give depth to the invention, we present the formalism with regard to a specific application, i.e., passenger identity verification and passenger name list matching against a "watch list," It is understood that the invention, however, is of a general nature and is suitable to a wide range of applications.

To make clear the use of this invention, the following notation describes an extracted entity 115 as a passenger for an airline flight. For a given passenger, for a given flight, the vector variable set below is identified:

$$P(k)=\{P(k),A(k,m),C(k,n)\},$$

where k=1 ... K, for a total of K passengers, m=1 ... M for a given passenger's specific set of flight reservations, and n=1 ... N is the context information associated with a given passenger's reservations, and serves to notate a potential many-to-one mapping for context (e.g., a set of one or more flights booked simultaneously by the same reserving agency).

The state of knowledge that will be provided for any given $k^{th}$ passenger will be identified as $\{P^i(k), A^i(k,m), C^i(k,n)\}$, where the index i=1 ... I.

In order to determine the various confidence measures that can be asserted about a given passenger and their flight arrangements, a rule set Ω (121) is defined as:

$$\Omega=\{\Omega(\alpha)|P,A,C\},$$

where the subscript (parenthetical notation) k is dropped, and the subscript (parenthetical) notation a refers to this as being the initial rules set that will be applied to the vector set P={P,A,C}. This identifies the rule set 121 as being conditional on the available passenger information, action set, and context.

Passenger vetting is typically not accomplished by a single set of criteria, but rather by satisfying a nested criteria set until sufficient confidence is gathered that the passenger both is the individual represented in the data, and that the passenger's intentions are not harmful to national security.

The rules typically operate by generating possible hypotheses about a passenger, e.g., that the passenger is other than who is represented in the data. Typically, both plausibility and potentiality issues (described more fully below) are addressed in an iterative manner, until potential hypotheses regarding plausible alternatives for passenger identity, etc., as well as the potential impact are resolved, According to one embodiment of the invention, FIG. 1 shows a system for performing evidence-based decision making. FIG. 1 shows a generation of a set of candidate hypotheses 145 as governed by a rule set 121, following which hypotheses are validated and/or refuted 150, with additional evidence 135 gathered as needed 160 to accomplish the process until satisfactory results have been achieved, FIG. 1 shows a rules process for hypothesis generations validation, and refutation, for the specific instance of matching passenger names against a "watch list," generating a resultant evidence function E (155), with potentiality generating the acceptance criteria Δ, so that when the evidence E>Δ, for a given hypothesis, the hypothesis is accepted. Otherwise, further evidence is required.

As illustrated in FIG. 1, for the case where passengers are being matched against "watch list" persons, the incoming information would be a set of PNRs (Passenger Name Records) 115, one per passenger. For each PNR 115, there would be a set of rules generated 121, which might be similar for the set of PNRs.

Since there is substantial variability in both the types of queries that can be raised about a given passenger's represented identity, and also a potentially large number of different cases for both proposed actions and context, it is reasonable that different initial hypotheses can be made about different individuals, based not only on their data, but also their associated proposed actions and context. This means that there are potentially several different rule sets 121, tuned to different "states" of initial plausibility and potential threat, as associated with context and proposed passenger actions. For this reason, the first step in passenger validation is to select the first appropriate rules set 121, Ω(1), according to initial passenger information, context, and proposed action.

Following selection of a specific rule set 121 Ω(1), rules are used to first propose plausible hypotheses 145, then to gather the necessary and sufficient information 135 that either validates or eliminates these hypotheses 150. In this example, the rules 121 generate a set of possible "watch list matches" that will next either be validated or refuted.

In this particular example, the "watch list" 105 is comprised of a set of names, with order-of-magnitude $o(10^x)$ This is used, following a rule set 121 and/or automated procedure, to generate an "expanded watch list" 110 using name variants, typically greater than the size of the original "watch list," $o(10^{x+1})$ up to $o(10^{x+2})$, or even larger. Further, using a variety of methods, well known to practitioners of the art, a large number of variants can be generated from a given passenger name, resulting in a potentially very large number of initial hypothetical matches.

This large number of initial hypothetical matches will now be either validated or refuted 150, under governance of the controlling rules set 121 Ω(n), which initially is Ω(1). This rules set 121 defines the "acceptable evidence" thresholds, using contributions from potentiality via the threshold processor 140, as described in the following section. Further, the rules set 121 defines the types of evidence that will be accrued, and the order in which they will be aggregated. (This step is actually a set of complex steps, further described in following subsections.)

The vector variable ε is used to represent the set of plausibility values (belief, plausibility, disbelief, etc.) that a person is a match to a given "watch-list person". The vector variable θ corresponds to the specific context variables associated with each of the plausibility vector elements. They can, for example, represent the likelihood of obtaining certain kinds of information, the statistical likelihood of correct information, etc.

The variables $\epsilon$ and $\theta$ are both functions of P, A, C, and $\Omega$;

$$\epsilon = F(P,A,C,\Omega), \text{ where } 0 <= \epsilon <= 1, \text{ and}$$

$$\theta = G(P,A,C,\Omega), \text{ where } 0 <= \theta <= 1.$$

The total evidence function E(155) is a function of the vector variables $\epsilon$ and $\theta$;

$$E = f(\epsilon, \theta).$$

The total threshold function $\Delta$ is a function of the potentiality, as will be defined in the following subsection.

$$\Delta = g(\text{Potentiality})$$

According to one embodiment of the invention, E is developed through incremental evidence accrual, so that ultimately $E >= \Delta$.

Once the data is gathered, it is likely that certain hypotheses will be sufficiently refuted to he removed from the set of hypotheses being considered. There will typically also be certain evidence gathered and aggregated to suggest specific next forms of evidence that would be sufficient to resolve certain other hypotheses. Further, certain other hypotheses may be in direct conflict with others—e.g., if evidence is gathered in support of one, it may cast strong doubt or disbelief on another, and vice versa. Thus, at this stage, a certain amount of reconciliation between the remaining hypotheses can be done, often aided by judicious selection of new evidence items.

To accomplish this, a set of reconciliation rules R is applied by a reconciliation processor 160. The variable E' represents the resolved evidence 165 (one value of E' for each hypothesis) that a person is or is not a match to a given "watch list person". If this resolved evidence is greater than $\Delta$, then the passenger is accepted as matching the "watch list person." Alternatively, if $E' \geq \neg\Delta$, or the evidence value is sufficiently strong as a disbelief in the match, then the hypothesis can be considered to be refuted, and eliminated from the candidate hypothesis set.

Very often, though, additional evidence will be needed. At this point, a new rules set will be generated, $\Omega(n+1)$, where n was the ordinal value of previous rules set.

This approach suggests that information is gained incrementally, following a set of rules that govern the information-gathering process. After each rule application, the result is evaluated, and if concerns regarding plausible alternatives and potential for harm are satisfied, then the information queries are stopped. If more information is needed, then the next rule is accessed to obtain the next small information increment.

Further, information increments do not require bringing back the full information from the data source. Rather, the query can be satisfied by applying a measure to a specific (typically rule-based) query, and returning a "satisfaction" result that would be either a returned score or limited result set.

When applied to a group of passengers, the process can sometimes be expanded to account for certain commonalities. Given an initial set of passenger data $P^j(k) = \{P^j(k), A^i(k,m), C^j(k,n)\}$, the first step is to apply the rule association set $\vartheta$ to generate the appropriate corresponding rule set $\Omega^\alpha(k)$, where $\vartheta$ essentially performs a multidimensional look up task, and characterizes the specific P, A, and C vector elements against normative values defining different combinations, and selects the appropriate rule set $\Omega^\alpha(k)$ which will be used to initiate the validation process. (Note that $\Omega^\alpha(k)$ corresponds to $\Omega(l)$, described earlier for a single passengers but this time the $\Omega^\alpha(k)$ refers to a subgroup of similar passengers.)

It is possible, although not always the case, that the specific vectors A and C will fall into one of a set of well-characterized "prototype" vectors, where the vector elements (VEs) for the prototype represent normative value ranges and also specific selection of class-type variables from within the possible type-delimited sets. In this case, selection of an initiating rules set will follow a well-defined process that is applicable to a large range of personal (P vector) data.

Once a rule set $\Omega^\alpha(k)$ has been selected, it provides an associated set of criteria, which for simplicity in this case will be referred to as the scalar element $\delta_\alpha = \delta(\alpha)$. (Note that $\delta_\alpha$ may be nonscalar, and that defined values for $\delta_\alpha$ may be dependent on a particular rule set.)

Rule set $\Omega^\alpha$ will be composed of both plausibility and validation (likelihood) rules, Q and V, respectively, where the plausibility rules generate various candidate hypotheses, and the likelihood rules gather evidence either confirming or against these hypotheses. Thus, the operation of the rules will exercise first Q and then V.

Application of the set of rules Q will build out a set of candidates $\{X^j(k), \epsilon^j(k), (k)\}$, where X is a specific hypothesis associated with P(k), and $\epsilon$ is the associated initial confidence factor that the hypothesis could be true.

V will then apply, with rules that will then constrain the plausibility values towards the likelihood that such is actually the case, thus generating the set $\{X^j(k), \epsilon^j(k), \tau^j(k)\}$, where $\tau(k)$ represents the likelihood and mitigates against $\epsilon^j(k)$.

In one embodiment of the invention, the data quality measurement plan will include a quantitative and qualitative evaluation of the accuracy and completeness of the data. The following measures arc proposed to begin establishing the quality of these databases; (1) number of entities reporting and for each entity (a) various data fields, (b) number of certain records with entries in the following fields and (c) other data fields.

In another embodiment of the invention, the effectiveness measurement plan will include normal volume testing using a replicate mix of normal transactions and transactions with errors, changes and supplements. Testing will include both qualitative and quantitative evaluation of the capability of the system to accurately measure the percentage of (false positives) and incorrectly failing detection (false negatives).

The process of putting a decision into context can be viewed as the interaction between plausibility and potentiality. The function of plausibility (which refers here broadly to the full set of vector elements referring to the various belief/confidence aggregated measures that can be made about a given hypothesis) is to provide a (set of) valuation(s) towards validating and/or refuting the hypothesis. The function of potentiality is to mitigate the tradeoff between risk and cost, where cost is understood to not only refer to the actual cost in terms of accessing certain data elements, or even the processing time involved, but also the "societal costs" associated with gathering information about an entity, which might be a person.

To illustrate how these concepts would be used in a specific application, we consider the case of passenger screening for airline transport. In this example, plausibility refers to the degree that an assertion can be true, and is (using Dempster-Shafer logic) the sum of the belief plus the uncertainty. Potentiality, on the other hand, is a conditioning factor, obtained independent of any specific evidence about a given entity.

Thus, for this example application potentiality is a measure governing the need to obtain more information regarding a person's identification, related to the potential that the person could take action harmful to national security interests. Potentiality is a function of (1) How well do we believe the person is who he or she says? (2) How likely is it that their stated intention (e.g., flight on a passenger plane) would afford them the opportunity to take harmful action and (3) How well can we establish that this person is NOT a watch-list match?

Figure 2:
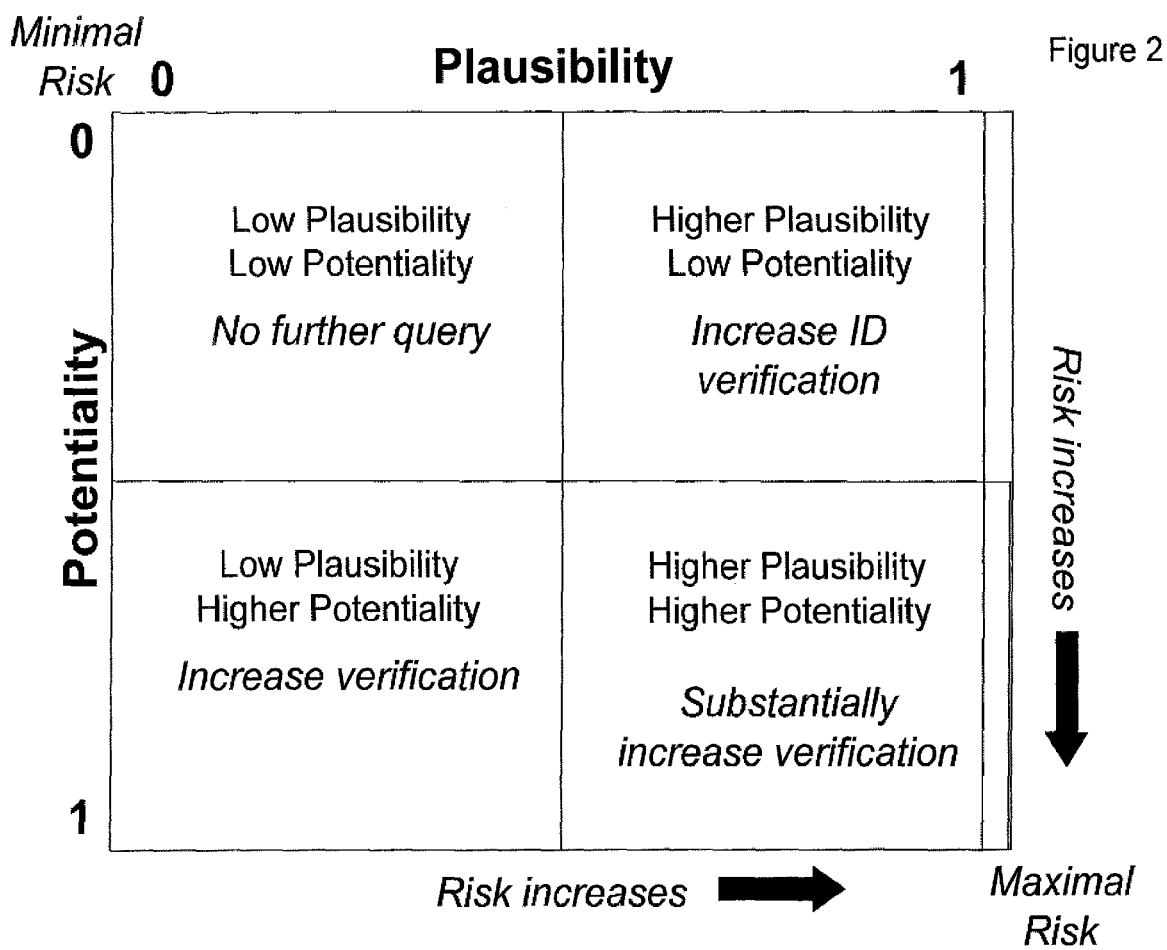
FIG. 2 is a chart illustrating the relationship between potentiality and plausibility according to one embodiment of the invention.

According to one embodiment of the invention, potentiality interacts with plausibility as is show in FIG. 2. As shown in FIG. 2, situations with higher plausibility (e.g., for a person plausibly being able to cause harm) and with higher potentiality (for actions by this person to cause severe harm) will require either or both greater verification, determining that the person is either not someone who would be likely to cause harm (hypothesis refutation), or that the person positively is someone who is not likely to cause harm (hypothesis validation of a benign hypothesis).

Potentiality factors are used to control costs. In the case of "watch list matching," the potentiality role is to determine not so much whether or not a given person is the one represented by a given set of records, or even whether or not that person matches against some list of "named entities" that are to be allowed or denied certain actions or opportunities. Rather, the potentiality role is to determine the potential for impact that such a person could have in a given situation. If the person is traveling to a major metropolis, or will be in a place where heads of state are gathering, then the potential harm is conceivably greater than in other instances. Because of the risk of greater "cost" of harmful action, the potentiality factor would increase. This weighs against the cost of increasing validation (e.g., that a person is not a watch-list match). Costs for increasing validation of large numbers of persons can become significant. These costs may be tangible, such as those associated with gathering evidence, or intangible but none the less real, such as a further intrusion on the privacy of a given person. Either way, the potentiality factor allows for both justification and cost management of the extra effort necessary to ensure greater validation in high-risk situations.

This approach allows for a wide range of applications. In one type of application, the matching of persons against a "watch list" could be used to deny access to certain actions or opportunities. Conversely, a different application could use the same form of logic to ensure that a person who positively matched against an "allowed persons" list was granted access to actions or situations. Clearly, the more that certain allowed/disallowed actions or opportunities can have important ramifications, the more worthwhile it is to invest in the cost of matching individuals against a "named entity list."

Potentiality can also be used to address benefit, as an indirect function of risk. In this case, the "risk" is associated with the expense of making a focused effort to reach a particular subgroup of persons. In the cases of focused marketing, collecting debts, or making strategic decisions based on an action or statement by a public figure, it is important to assess the exceptional benefit that could result from investing greater attention or effort to communicate with an individual. For example, in the case of direct marketing of a luxury good, such as sailboats, the benefit for making a sale is high. This benefit also increases with the value of the boat purchased. A list of potential clients can be accessed a number or ways, e.g., through magazine subscription lists, attendance at a boat show, etc. Only a few of these persons will actually have the purchasing power at a given time to make a high-value purchase. The benefit increases with the size of the sale, so it is important to push the high-value options to those persons who have the greatest plausibility of making a purchase decision. In this case, potentiality (for high-value sale) governs the effort to increase plausibility in purchasing power and interest, before the risk of investing expensive marketing materials and energy is allocated to a specific subgroup of persons.

Plausibility, as used in this approach, is a way to describe not so much the confidence or certainty that a given assertion is true (the belief), but really the degree to which it is credible that a given assertion could possibly be true (plausibility=belief+uncertainty). The presence of an uncertainty measure makes it possible to express both plausibility and doubt. It is a way to express what is not known about a given person, situation, or thing. It also makes it possible to identify when there are conflicts; when one evidence piece supports the belief that a person is who he or she claims to be, and other evidence says he or she is not what is claimed. When conflicts increase, the need to gather/assess more evidence for verification increases.

According to one embodiment of the invention, the plausibility concept can be used multiple ways in the approach to entity verification. For example, in entity identity verification the use establishes that an entity is correctly identified in terms of known information that can be associated with that entity. An example would be identify verification for passengers making reservations for a plane flight, whose identity can be established by matching the information on their Passenger Name Record (PNR) against known information, e.g., from a commercial or government data source, High plausibility and high belief mean that the personal information as represented in the PNR is very likely what is claimed, and is supported with consistency in external data, In this case, high belief and plausibility scores mean that identity is verified.

In the case of entity matching, high plausibility means that it is "plausible" that a given entity matches to some specific known, reference entity. The difference between this case and the previous is that in the first, the reference entity is actually the one being posited for identity verification, and the verification information can come from multiple disparate sources, which may collectively confirm different attributes associated with the entity. The process focuses on accumulating sufficient confidence in confirming information provided by potentially disparate sources against the information provided about the entity whose identity is being verified. In contrast, entity matching assumes that the entities who could be matched (the reference entities) are largely already known, and that sufficient already-verified information is attached to each of these so that the task is more one of matching the given extracted entity (the one being matched) against one of these reference entities. There would preferably be some attributes or context associated with the extracted entity, and there would preferably be a larger set of attributes associated with each reference entity. Preferably, also, the attributes and/or context associated with the extracted entity form a subset of the attributes and/or context associated with the reference entity, to facilitate the matching process.

According to another embodiment of the invention, it is possible for an entity to be matched not to a specific, known entity, but rather to a profile or a type. In this case, the methodology expands to include those methods known to practitioners of the art for traditional clustering and classification methods. The distinction that makes this capability part of the current invention is that potentiality factors can be used to influence the acceptability thresholds for decision-making about profile matches.

The following discussion illustrates how potentiality affects the decision thresholds generated by the decision threshold processor, taking as illustration the case of determining whether a passenger had sufficient ID verification to be allowed to board a plane.

Figure 3:
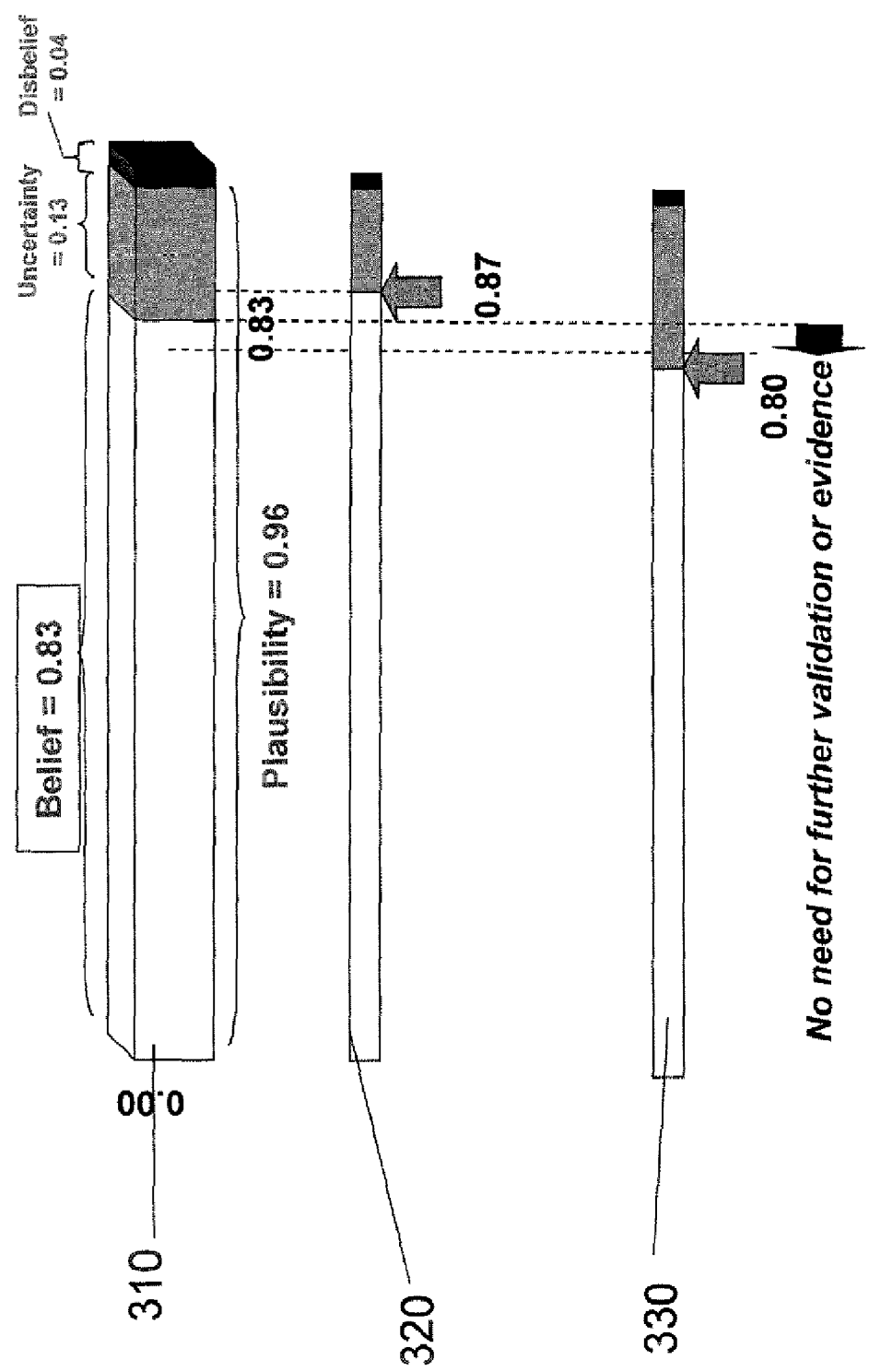
FIG. 3 is a block diagram illustrating the application of a potentiality value to evidence accumulation according to one embodiment of the invention.

FIG. 3 illustrates the case where potentiality allows a reduction in the belief and plausibility scores required in order to allow a "verified identity." This means that, over a statistically large number of cases, proportionately fewer evidence items would have to be accessed in order for the same set of entities to have "verified identity." Conversely, it means that with the same initial set of entities and the number of evidence items that would normally be provided for these entities, a greater fraction of entities would be judged to have "verified identity."

FIG. 3 illustrates how potentiality acts to lower the required score in identity verification. In the case where the resultant identities are being matched against watch-list persons, an example person has a belief in his identity verification of 0.83 and a plausibility of 0.96 (310). In this example, the initial cut-off (before potentiality is applied) (320) for acceptable identity verification is a belief of 0.87. However, in this example, the potentiality is such that the requirement for belief in identity verification is lowered; from 0.87 to 0.80 (330). In this case, the passenger's identity is accepted as verified for this flight, with no further evidence required to improve the identity verification score.

Figure 4:
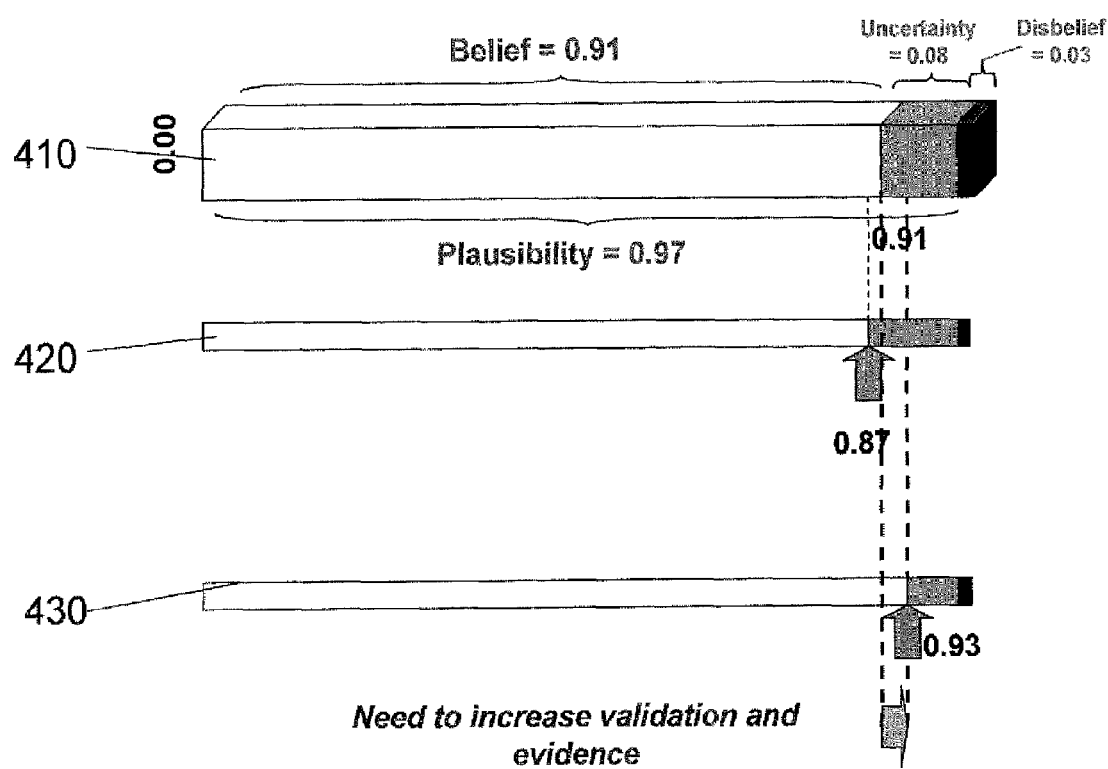
FIG. 4 is a block diagram illustrating the application of a potentiality value to evidence accumulation according to another embodiment of the invention.

FIG. 4 illustrates the case where potentiality causes an increase in the belief and plausibility scores required in order to allow a "verified identity." This means that, over a statistically large number of cases, proportionately more evidence items would have to be accessed in order for the same set of entities to have "verified identity." Conversely, it means that with the same initial set of entities and the number of evidence items that would normally be provided for these entities, a smaller fraction of entities would be judged to have "verified identity."

FIG. 4 shows how potentiality acts to increase the required score in identity verification. In the case where the resultant identities are being matched against watch-list persons, an example person has a belief in his identity verification of 0.83 and a plausibility of 0.96 (410). In this example, the initial cut-off (before potentiality is applied) for acceptable identity verification is a belief of 0.87. (420) However, in this example, the potentiality is such that the requirement for belief in identity verification is increased; from 0.87 to 0.93. (430) In this case, the passenger's identity is not accepted as verified for this flight. Further evidence must be gathered, and an improved belief score will be necessary, in order to achieve an acceptable ID verification.

While the methodology proposed for determining hypothesis verification and/or refutation uses other than traditional classification methods, the methodology for determining potentiality values can indeed make use of such methods. A preferred embodiment is to use Bayesian Belief Networks (BBNs) to create potentiality values, as they provide a means of spanning all logical combinations of situations.

BBNs are a form of graphical model enabling directed computation. As is well-known to practitioners of the art, BBNs (making use of graphical models) play a vital role in decision theory.

As a preferred embodiment, BBNs can aggregate conditional probabilities providing evidential support that a certain belief is so, and a rationale for adjusting the potentiality, or threshold of evidence values needed to provide "acceptable belief" in a given assertion (either identity verification or PNR matching against a watch-list person). These two different applications are discussed further below.

As stated above, an efficient and effective approach to establishing the nature of an entity is that of trying to prove that the entity is a certain thing (hypothesis confirmation or validation to a high belief level), it is often preferable to refute certain other alternative hypotheses. For example, in the case of watch list matching, consider the case of showing that an extracted entity (a given person) is a match to a watch-list person W(i). Instead of trying to build up sufficient evidence for proof, it is preferable to look for sufficient evidence to disprove. As soon as sufficient evidence for disproof is available (hypothesis refutation), the gathering and computing of more evidence factors ceases.

For illustrative purposes, the use of BBNs to establish potentiality is shown in the context of performing matches between extracted entities (i.e., persons) and reference entities (here, "watch-list persons.")

The recommended methodology is to identify characteristics or attributes that can be used to differentiate PNRs from their hypothesized watch-list matches, or W(i)'s. These attributes are likely to mean that the person is NOT a match to a given W(i), assuming (for these examples) that the W(i) falls along the probable distributions for their type.

To begin with, the candidate pool or initial set of extracted entities consists of hypothetical matches between certain PNRs and specific associated watch-list persons. This pool can be identified as the set S, $$S=(PNR(j), W(i)),$$

where the subscripts refer to the $j^{th}$ PNR (j=1 ... J), and the $i^{th}$ watch-list person W (i=1 ... I).

We will state that the hypothesis is that the "H(PNR(j)= Watch-List person (i))" or H(PNR(j), W(i)) is supported by total evidence E(i,j,k):

$$H(PNR(j), W(i))|=E(i,j)$$

using a logic formulism based on that advanced by Keith Devlin (in Logic and Information, Cambridge Press, 1991), where the notation means that the situation, or belief that the person represented by PNR(j) is the same as "Watch-list person (i)" or W(i) is supported by total evidence E(i,j). The total evidence E is an evidence-aggregation function E of the set of multiple evidence items $\{e(i,j,k)\}$, where k refers to the $k^{th}$ item of the evidence set supporting association between PNR(j) and W(i), so that $$E(i,j)=E\{e(i,j,k)\}.$$

Two forms of evidence aggregation will be used: an independent evidence combination method, and a correlated evidence combination method. Independent evidence is where two or more types of evidence have nothing to do with each other; they are completely independent. Methods used for this kind of evidence combination include BBNs along with neural networks and Dempster-Shafer logic. Dependent or correlated evidence is when one evidence item is conditionally dependent on another piece of information. A BBN is a good means for performing this kind of evidence combination.

The following illustrates BBN formation. Suppose that a person with an identity-verified PNR has a name matching a name variant for a foreign-born watch-list person. There is no known U.S. address for the watch-list person. Assuming that the watch-list person could possibly be in any location in the U.S., a probability analysis is carried out by the present invention to determine the likelihood that the PNR corresponds to the watch-list person, Suppose that the PNR gives an address located about 20 miles west of Jamestown, N. Dak., with a 0.9 belief factor on the address. Using probability figures drawn from census data, we see that the likelihood that any given foreign-born W(i) is in a non-metropolitan area is 0.053 (5.3%). Further, the likelihood that a foreign-born W(i) is in the Midwest is 0.113 (11.3%). (See *Census Publications for* 2002 for supporting details.)

Since we are trying to refute the hypothesis that PNR(j)= W(i), we look to express the converse likelihoods. The likelihood that the foreign-born W(i) is not in the non-metropolitan area (outside of Jamestown) is 0.947. Similarly, the likelihood that the W(i) is in the non-Midwest is 0.887.

In order to refute the hypothesis that the PNR is a match to a specific watch-list person, two assumptions about this particular watch-list person are made.

Figure 5:
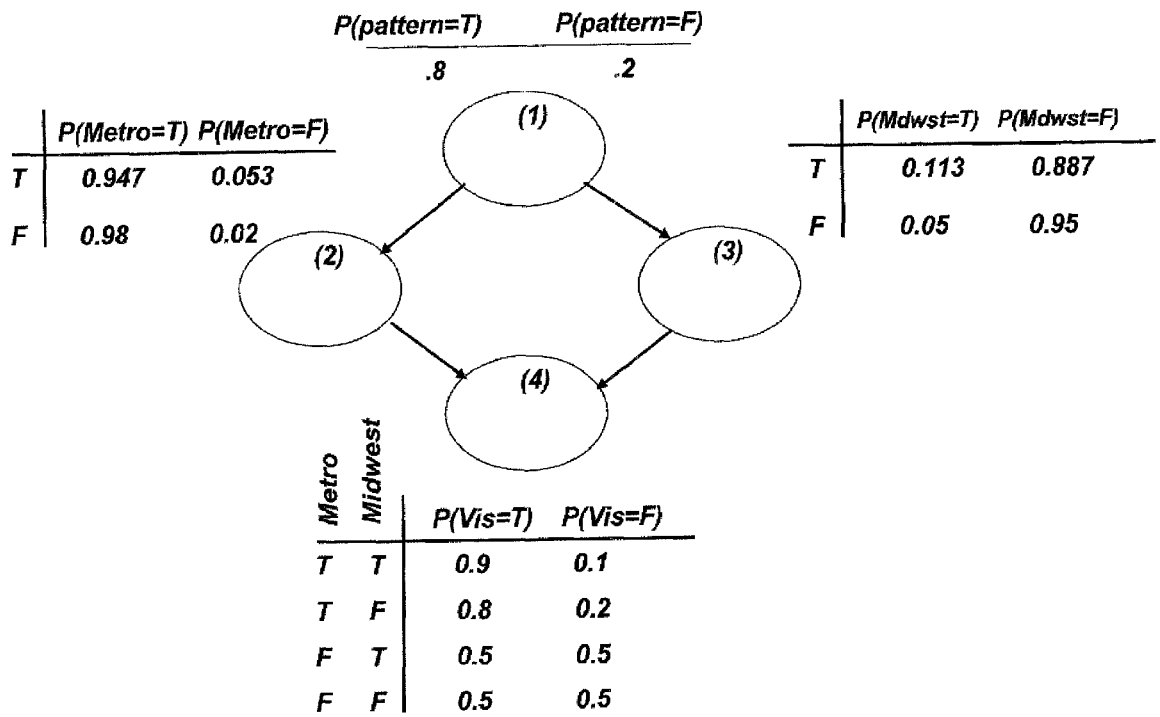
FIG. 5 is a block diagram of a Bayesian belief network according to one embodiment of the invention.

Take the case where the hypothesized watch-list match is for a person who would be keeping mid-level visibility. We will assume that such a person will have a location distribution likelihood (0.8) similar to that of Foreign-born persons for his/her original world region. Note that the direction of dissimilarity would be to increase the likelihood of being in a more metropolitan and decrease the likelihood of being in the Midwest. We construct the BBN as shown in FIG. 5. This figure encodes several known foreign-born person demographics along with some assumptions about the visibility of a potential watch-list person. This figure is specifically developed to assess probabilities for Midwest vs. non-Midwest residencies.

The last computational table in FIG. 5 is an assumption, and attempts to assess the likely visibility that a watch-list person would have regarding residence and other factors, depending on both where they lived and the fact that they were not trying to keep an especially "low-profile" visibility in commercial data.

The present invention proceeds with the computation using two cases with following factors:

Case 1: Hypothesized watch-list match, W(i), is to a person with a probability of 0.8 of following the "normal location" distributions,
  If following the "typical" location distribution, then the probability that W(i) will live in non-metro Midwest is 0.053*0.113, or 0.005989, or approximately 0.006,
  It is equally probable that this person would be visible or not visible in commercial data sources, so the probability that this person would show up in commercial data is 0.003 (halving the previous figure of 0.006),
  Thus, it is not likely that PNR(j) is a match to W(i) given that the PNR is for non-metro Midwest, since the PNR(j) has a high-confidence identity verification, and W(i) is not likely to appear in commercial data as living in that location. This is the 80% probable case.

Case 2: Hypothesized watch-list match, W(i), is to a person not following the "normal location" distributions (0.2 probability),
  This actually decreases the probability that W(i) will live in non-metro Midwest to 0.02*0.05, or 0.001,
  It is still equally probable that this person would be visible or not visible in commercial data sources, so the probability that this person would show up in commercial data is 0.0005,
  Thus, it is even less likely that PNR(j) is a match to W(i) given that the PNR is for non-metro Midwest, since the PNR(j) has a high-confidence identity verification, and W(i) is not likely to appear in commercial data as living in that location.

Next, the present invention uses potentiality to assist in hypothesis refutation; in this case, the hypothesis being that the extracted entity (matching a known person residing in Jamestown, N. Dak.), is the same as a reference entity on the "watch list." We will further assume that the whereabouts of the reference entity are unknown. To do hypothesis refutation, we need to achieve disbelief greater than some threshold $\tau 1$, and doubt greater than some threshold $\tau 2$.

The mechanisms for accruing values for disbelief and doubt, along with belief, plausibility, and conflict, are further identified below, Note, however, that doubt=disbelief+uncertainty, and that belief+disbelief+uncertainty=1.

Suppose, for sake of argument, that in order to successfully refute the given hypothesis, a disbelief of more than 0.35 and a doubt of more than 0.85 are typically required. In this case, the context of the extracted entity's situation—residence in a Midwest rural area—would work on the thresholds $\tau 1$ and $\tau 2$. It would lower the disbelief necessary, via a mapping function from the potentiality BBN towards the threshold, e.g., mapping a BBN maximal output (in the above case) of 0.003 towards a threshold adjustment of perhaps 0.03. This could (assuming a linear, or simples subtractive, impact on the original thresholds) result in new thresholds of disbelief of more than 0.05 and a doubt of more than 0.55 These would be easier to achieve, and thus refute the hypothesis, Suppose that the potentiality of risk associated with the particular watch-list person were extreme, and so that the thresholds were adjusted positively to require greater disbelief for refutation. For example, suppose that the potential risk factor resulted in an increase in the disbelief to be more than 0.45 and a doubt of more than 0.95. The threshold adjustment coming from a location-based potentiality would still impact the thresholds, but leave values of 0.15 and 0.65 respectively. This might require more evidence to be accrued in order to defeat the match hypothesis. This could conceivably require accessing greater evidence, along with a rule set governing the kind of evidence to be accessed and the impact of the evidence aggregation. For example, the rule set might indicate finding a length of time that the extracted person had been in Jamestown, N. Dak. If the evidence showed residing in ND for over 40 years, and the reference watch list person was under 30 years old, and had probably entered the country within the last five years, then the evidence in favor of defeating the match hypothesis would accrue beyond the needed threshold.

Clearly, several computations such as this can be done, and the evidence accumulated for a wide range of cases. It is likely that use of these various potentiality factors will need to be governed by a rule set as well as a set of mapping functions, indicating how they impact the original thresholds.

A suite of potentiality indicators is defined as a set of explicitly measurable, or otherwise definable, characteristics that serve to identify a specific quality or status which can be used as criteria for categorization.

Potentiality is an embracing concept that includes a range of factors. Illustrative, but by no means complete or exhaustive elements that can influence potentiality, can include but are not limited to analysis of regional factors, nature and means by which transactions or communications are made, distances involving actions or interactions of various entities, times between indications of actions (e.g., as in making a reservation) and the action itself (e.g., getting on a plane), and locations from which intentions of actions or the actions themselves are posted.

There are many other indicators that could be explored to support the needed potentiality concepts. The following defines an initial suite of potentiality indicators, a scoring methodology, and the feasibility of obtaining these indicators.

For purposes of providing modifications to a decision values set, the BBN will e constructed with a single output node, whose value can range between −1 and 1:

$$-1 \leq y \leq 1$$

This output value will in fact be the potentiality, applicable to a given set of decision values.

$$\text{Transfer\_Func}\left[\sum_{n=1}^{N} \omega_n BBN(n)\right].$$

The initial set of indicators should be developed from information already contained in existing information associated with the entities for which hypotheses are being generated, so that the impact upon the cost-providers would be minimal if any at all. As one gains experience with potentiality indicators, it may become desirable to include additional indicators which are not indicated in the initial data but are easily obtained and not an invasion of privacy.

Some of the indicators that could be used are also part of the data used for hypothesis verification and/or refutation, and will be readily available. Also, the plausibility level and belief levels determined from matching with commercial data are themselves indicators that could be used, While many methods can be used for evidence accrual, this invention addresses the need to provide the values used in implementing the selected method. As a preferred embodiment, the method used would be the Dempster-Shafer method for evidence accrual via an evidence processor.

The objective of this invention is to formulate a means and method by for establishing parameter values that will enable a previously-known, formally-defined method (e.g. Dempster-Shafer logic) to be applied to real-world situations. An example such situation, which will be used for illustration purposes, would be to validate or refute a hypothesis that a given extracted entity would be the same as a given reference entity.

This hypothesis verification step will be determined by three factors:

The plausibility greater than some threshold that the extracted entity actually corresponds to a known reference entity is greater than some threshold, so that we can assert that the match to the reference entity is plausibly verified to at least some defined value, The doubt that the extracted entity does not actually correspond to a known reference entity is less than some separately-defined threshold, so we can assert that doubt about the match to the reference entity is within a known tolerance, and The uncertainty that the extracted entity actually corresponds to a known reference entity is within some defined value range, so that we can assert that uncertainty about an ID is within a known tolerance.

These assertions will be made using a mathematical means for evidence combination, known to practitioners in the field as the "Dempster-Shafer method," described below.

The goal will be to determine plausibility with regard to hypothesis verification. The illustrative application will be to "entities" describable by means of feature vectors, where the feature vectors have data fields including fields for belief, plausibility, disbelief, doubt, uncertainty, and conflict measures. These measures will be taken and combined at various levels of granularity. Further, there will be measures for the "whole" as well as for specific elements of data verification (e.g., date of birth, address, etc.). Evidence will be accessed as needed in order to accrue a plausibility mass (defined in the following subsection) greater than a predetermined threshold, or until certain levels of conflict or disbelief are found that require special handling. Other cases described above can also be flagged for special handling, This method allows for the following objectives to be satisfied: Evidence accumulation should be traceable, both uncertainty and conflict in potential decisions/assignments should be represented explicitly, there should be a defined means for accumulating additional evidence to support potential assertions, so that a "minimal-cost" set of rules for obtaining evidence can be applied (assuming that each "evidence unit" carries an associated cost), and there should be a means to cut-off further evidence accrual after sufficient evidence has been obtained to support a given assertion, while the uncertainty and/or conflict about this assertion are within acceptable and defined limits.

The approach taken here for evidence combination provides the necessary representation and traceability for plausibility that a hypothesis is verified, doubt that it is being verified, positive or actual belief in the verification, negative belief or disbelief, along with uncertainty, and also representation of conflict—that is, when there is conflicting evidence. This uses an approach based on Dempster-Shafer reasoning.

A frame of discernment (FOD) is used to describe the potential states that could be observed, or about which beliefs could be gathered. In the case of hypothesis verification, we can immediately postulate a frame of discernment consisting of two possible situations, a verified hypothesis and a hypothesis that cannot be verified. Following standard notation (see, e.g., Klawonn & Smets), we identify the frame of discernment as $\Omega = \{V, \text{non-}V\}$, where V stands for the state of positive verification and non-V stands for the state of non-verifiability.

Belief is trust or confidence. Thus, the belief measure associated with a given assertion (e.g., positive hypothesis verification) is the same as giving a confidence for that assertion. In this case, we would denote the belief that a hypothesis is verified as Bel(V). In addition to belief, it is possible to have "active disbelief," that is, belief that the assertion is positively verified to be not true. This is generally referred to as belief in the "complement" of the assertion. In this specific application, this would be a belief that the hypothesis is not being verified. An example would be when evidence from a certain data source directly contradicts the data that is asserted to be true. This belief in the non-validity of ID is given as Bel(non-V), where "non-V" stands for the "complement of validity."

In addition to beliefs, either in the assertion or against it, it is possible to have some range of uncertainty. We denote the uncertainty here as U.

Each of these values is considered to be a "mass," e.g., a "belief mass," etc. Each value is between 0 and 1. Also, Bel(V)+Bel(non-V)+U=1.

Figure 6:
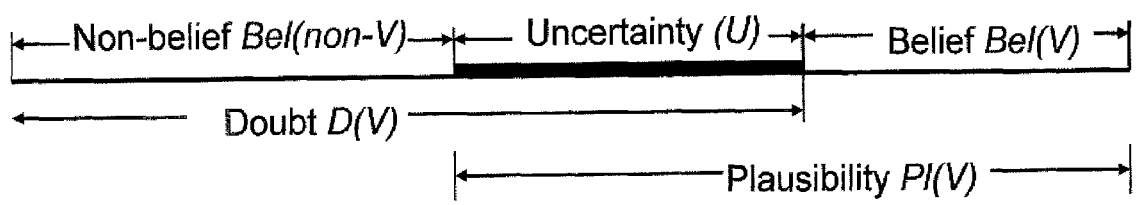
FIG. 6 is a block diagram illustrating the composition of a plausibility value.

We draw on the Dempster-Shafer approach to evidence combination for belief determination by defining the range of beliefs afforded by one form of evidence about a particular assertion (or classification) as shown in FIG. 6.

FIG. 6 illustrates how the range of plausibility is a combination of both Belief in Validity, or Bel(V), along with Uncertainty, U, The range of doubt is similarly a combination of both Disbelief in Validity (Belief in the Complement of V), or Bel(non-V), along with Uncertainty, U.

If the present invention could only access evidence from one source, this would be the extent to which we could assign belief uncertainty, and disbelief measures. But when evidence is combined from two sources, we can create a belief "mass" based on combination of beliefs and uncertainties provided from two forms of evidence, as is shown in FIG. 7.

Figure 7:
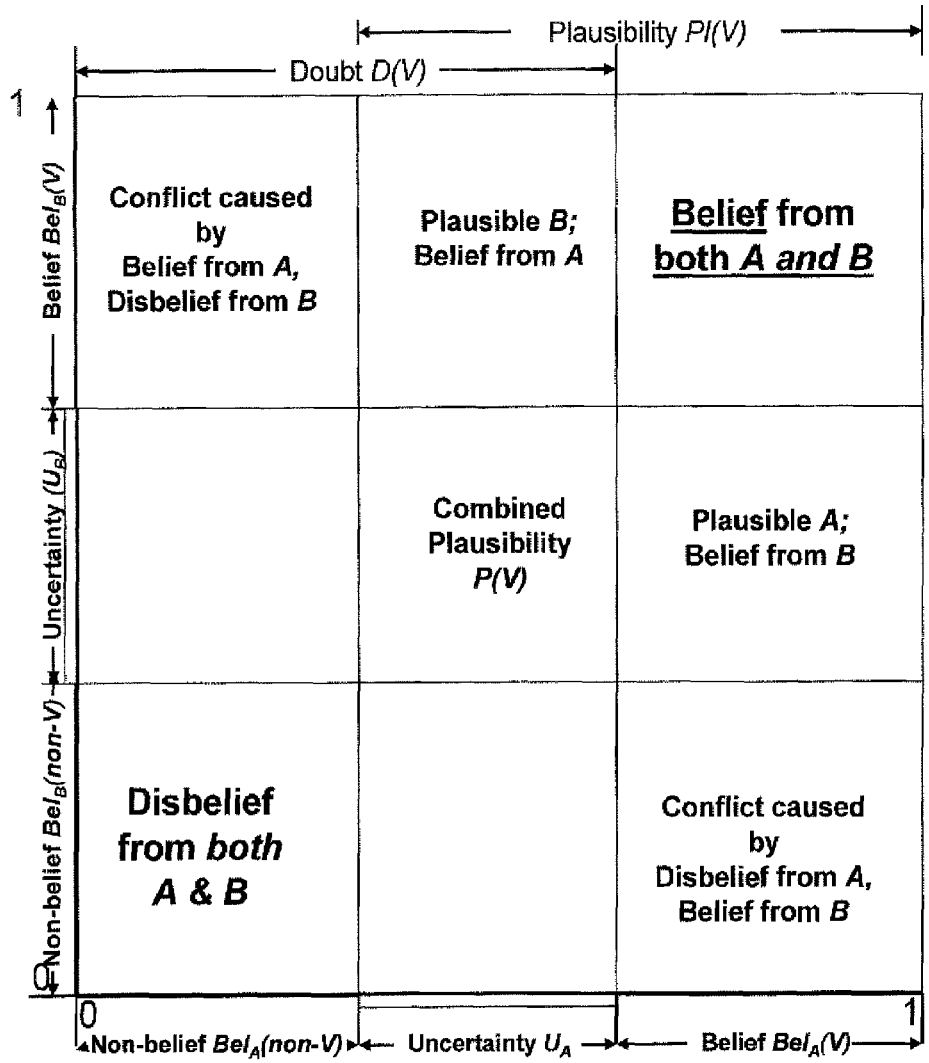
FIG. 7 is a block diagram of belief masses according to one embodiment of the invention.

FIG. 7 illustrates Dempster-Shafer belief uncertainty, and disbelief from two combined evidence dimensions. The upper right hand corner indicates the total "belief mass," the combination of the upper right four rectangles indicates the total plausibility (including belief and uncertainty measures), the uppermost left and lowermost right indicate conflict, and the left bottom corner indicates the "disbelief mass."

This figure illustrates formation of various "belief masses," ranging from belief disbelief based on combinations of the evidence from two sources. For purposes of simplification, the set of variables belief, disbelief, plausibility, doubt, along with uncertainty, and also representation of conflict, will be denoted as the set of belief measures, Further, this set can be represented as a vector $\hat{P}$.

The formalism as well as the methodology by which the set of belief measures can be produced will now be described, which will be a function of both the data available as well as the confidence-production methods.

The various belief measures using this approach are obtained by combining two (or more evidence) sources. This method allows for combining evidence from source "A" with evidence from source "B," where the "sources" in this case could refer to either to different independent data items (e.g., address, date-of-birth) from the same data source provider (e.g., a given commercial data system), or they can refer to combining the same type of data item, accessed from multiple sources.

For ease in viewing equations, we introduce a slightly different notation, understanding now that all references for belief, uncertainty, plausibility, conflict, and disbelief are with regard to the hypothesis verification. It is typically not necessary to represent doubt, as it is subsumed in other calculations.

The revised notation for Identity Verification measures will consist of:

Belief in the verified identity provided by evidence A, $Bel_A(V)=B(A)$,

Plausibility about the verified identity provided by evidence A, $Pl_A(V)=Pl(A)$, where $Pl_A(V)=Bel_A(V)+U_A$, and where $U_A$ is the Uncertainty provided by evidence A, Conflict about the verified identity provided by evidence A, $Conf_A(V)=Conf(A)$, and Disbelief in the identity verifiability provided by evidence A, $Bel_A(non-V)=Disbel(A)$.

The equation for generating a new "total belief" from belief combination is:

$$Bel(\text{Total}) = \frac{Bel(A) * Bel(B) + Bel(A) * U(B) + Bel(B) * U(A)}{1 - \text{Conflict}},$$

where

Conflict=Bel (A)*Disbel (B)+Disbel (A)*Bel (B).

We initiate the following approach to hypothesis formulation, stating that when the hypothesis is first postulated, there is no real belief or disbelief, but rather the plausibility that a given hypothesis could be true:

$\hat{P}$={Bel(Total), Disbel(Total), U(Total), Pl(Total), Dbt (Total), Conf(Total)}={0.0, 0.0, U(Initial), Pl(Initial), Dbt(Initial), 0.0}, where initially Pl(Initial)=U(Initial)=Dbt(Initial), 1.0.

Figure 8:
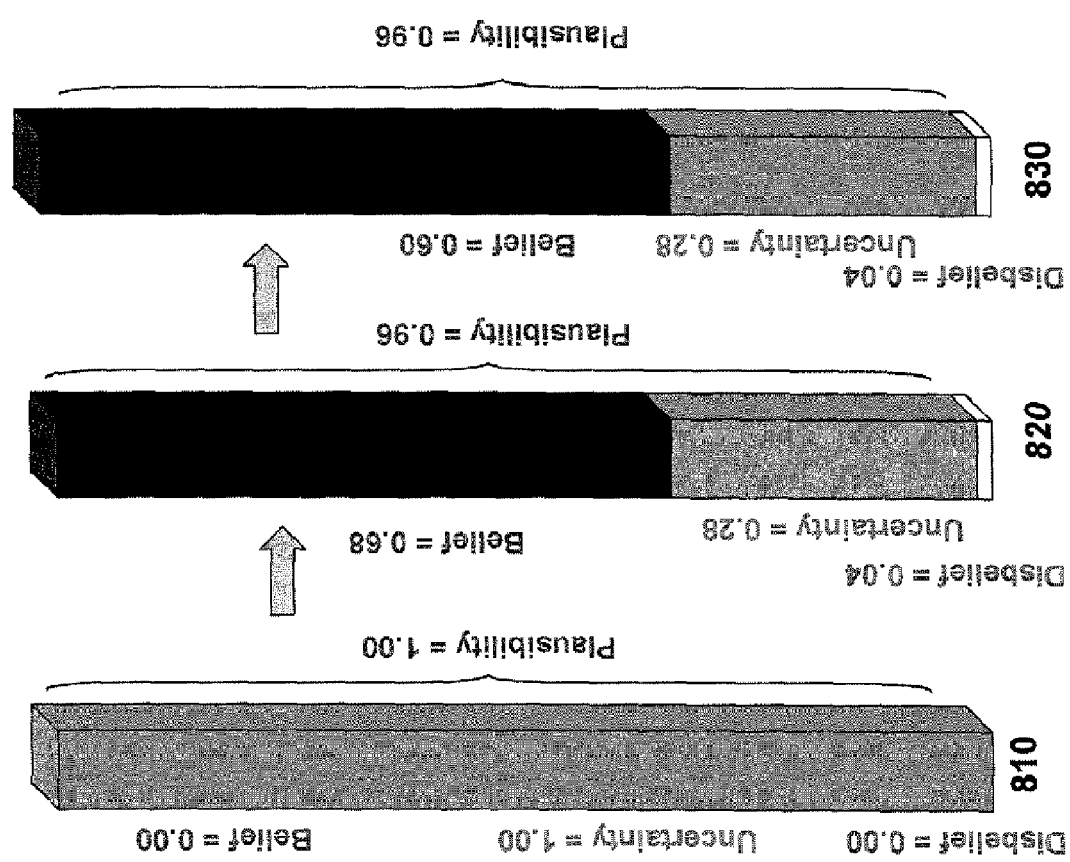
FIG. 8 is a block diagram illustrating evidence combination according to one embodiment of the invention.

The "evidence" that is used to generate the hypothesis is joined as a first step with this initial state where the hypothesis is equally "plausible" or "doubtful" to produce the first evidence accrual, as is shown in FIG. 8.

FIG. 8 shows an initial state where a hypothesis is equally "plausible" or "doubtful" 810 has the first increment of evidence 820 accrued, where the first evidence has a belief of 0.68, an uncertainty of 0.28, and a disbelief of 0.04.

Figure 9:
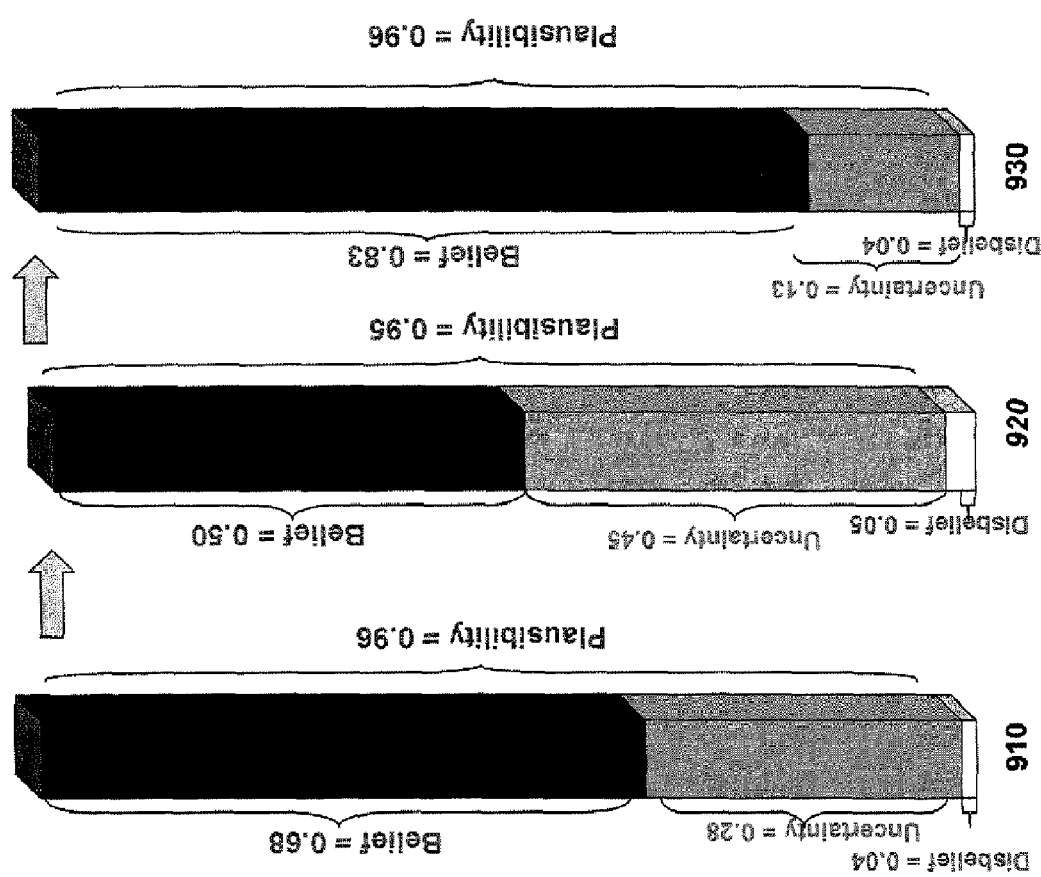
FIG. 9 is a block diagram illustrating evidence combination according to one embodiment of the invention.

FIG. 9 presents the next step, by which a second source of evidence is combined with the first, resulting in an "accrued evidence mass."

FIG. 9 shows a resultant state 910 arising from consideration of a first evidence source (as indicated in the previous figure) is combined with a second evidence source 920, where the second evidence 920 has a belief of 0.50, an uncertainty of 0.45, and a disbelief of 0.05. The new resultant state 930 has a belief of 0.83, an uncertainty of 0.13, and a disbelief of 0.04. This illustrates how two weak to mid-level evidence items can accrue to generate a reasonably strong belief in a hypothesis. Uncertainty is commensurately reduced.

One challenge in using a method such as Dempster-Shafer is that there needs to be a well-considered approach for assigning initial values to each evidence item. Additionally, there needs to be a means for assigning weights to each different evidence item.

According to one embodiment of the invention, the present invention is configured to complete the following. Identify a level of disbelief that could be reasonably associated with a given single form of evidence. Identify the overall level of uncertainty that would be anticipated either with regard to a single evidence item, or for the combined "evidence mass" after evidence combination has taken place involving at least two evidence items. Use this to select maximal ranges for beliefs that would be assigned for single evidence items. Adjust the maximal belief values for the evidence items that will be used to accommodate both the relative impact of giving a certain evidence item its maximal possible "belief score," and also the relative value that any given evidence item can have (versus other evidence items) for establishing belief.

The following illustrates a protocol, according to one embodiment of the invention, for the hypothesis where a person's identity is being validated. To simplify the problem, and to establish an overall understanding of variable ranges and interactions, we will make some simplifying assumptions and illustrate the method for combining two evidence items or masses, from two different evidence sources respectively.

Disbelief can be established using statistical aggregates across a population for known cases where even a positive or matching value for a given evidence item still does not provide absolute confirmation. In this approach, disbelief is based on a statistical distribution rater than specific assignment of value for an individual case.

An example of how this can be performed comes from the case of verifying the hypothesis that person's presented identity (i.e., for making a reservation on a flight, in a Passenger Name Record, or PNR) actually corresponds to that of a known person. This makes use of known statistics. In this case, the number of stolen identities in the U.S. has previously been reported as up to 700,000. Recent identity-information thefts amount to compromising another 145,000 IDs. Other sources provide the total number of stolen/synthetic IDs to be approximately 9 Million.

The total population of the U.S. is approximately 295 million persons. Thus, the percentage of active stolen IDs vice the population base, not scaled for any other factors, is approximately $9/295$, or 0.03. We further make the assumption that this same fraction could represent a combination of both those fraudulently IDs deliberately represented in PNRs along with simply a degree of error present in PNRs that would make it difficult to obtain good validation. This provides us with an ab initio belief in the non-verifiability of ID verifications across the population, or Bel(non-V)$_{min}$, of 0.03. This would be the disbelief used for all evidence feature vectors.

Uncertainty will be adjusted so that the resulting range of both belief and disbelief values, as "pushed forward" through the evidence aggregation method, yields uncertainty values in line with statistically-known uncertainties for the evidence as associated with classifier decisions for that population.

It should be understood from the outset that certain ranges of values will be permissible, and certain other parameter ranges will not be allowed.

To a reasonable extent, the initial values for beliefs, etc., can be "backwards-defined" as a function of what would be a reasonable degree of confidence given appropriate evidence combinations. This means solving forward to express the resulting belief as a function of contributing values for different "extrema," and identifying how different cases contribute to resulting end beliefs.

The following provides an outline of the mathematical steps that establish range bounds for certain parameters. This is done through considering the case where there are two sets of evidence masses, $E_A$ and $E_B$, from two different sources A and B, with regard to a given hypothesis. We assume, in order to render the calculations analytically tractable, that the disbelief values afforded by each evidence source are the same. We further assume, that if the two evidence masses each offer a "positive belief" for the hypothesis, that the belief values afforded by each evidence source are the same. (Otherwise, we take the case where one evidence source provides positive belief, and the other provides no positive belief, only uncertainty and a static value for disbelief.)

Our goal is to identify the permissible parameter ranges for the belief variables for different situations. We consider two cases:

Case 1—The "Corroborating Case": $E_A = E_B$, and both support the given hypothesis, so the two forms of evidence corroborate each other, and Case 2—The "Non-corroborating Case": Where $E_A$ is an evidence item that supports the hypothesis, and $E_B$ is evidence that does not (belief=0.0).

For simplicity in the calculations, we address Case 2 first. In contrast to the earlier step, where we attempted to identify disbelief based on prior statistics, we take the approach here that uncertainty will be consistent across the two evidence (or "measurement") sources, and that disbelief will change along with belief depending on observation.

This example Case works with the following assumptions:

Both evidence masses, $E_A$ and $E_B$, have the same degree of uncertainty, based on a combination of "measurement noise" and "process noise" in contributing to the belief and disbelief values, so that $U_A = U_B = U$.

The evidence mass B(A) from the one corroborating evidence source will be the reference belief, that is, B(A)=Y, for the "yes" belief.

The evidence mass B(B) from the non-corroborating evidence source will be 0; i.e, B(B)=0, since the non-corroborating evidence will not support the joint belief in the assertion that is initially asserted by B(A) alone.

In order to determine the disbelief (N for "no belief") associated with each evidence source, we recall the constraint that the sum of the evidence masses for each different evidence type must still reach one (Y+U+N=1). This gives different implications for the corroborating and non-corroborating evidences:

For the "positive belief" evidence, $Y+U+N_A=1$, or $N_A=1-Y-U$.

For the "non-belief" evidence, $0+U+N_B=1$, or $N_B=1-U$.

These relationships are diagrammed in the table in FIG. 10.

FIG. 10 illustrates evidence mass distribution for two different kinds of evidence values; for the "corroborating" case, both evidence items will use two forms of corroborating evidence, and for the "non-corroborating" case, one form of evidence will support, or corroborate, an assertion or belief, and the other will not support that belief.

We now have a formalism that can be expressed in terms of two unknowns; Y and U.

The goal now is to compute the resultant belief that comes from aggregating the two evidence sources, as was identified using the equations presented earlier in this subsection on Evidence Accrual.

For this Case 2, we let $C_2 = Y_A =$ mass of belief that a given assertion is valid when there are two forms of evidence, but only one corroborates with belief in the given hypothesis, and the other provides "no belief" towards that assertion. Then the D-S formalism for evidence mass aggregation gives;

$$C_2 = \frac{Y*0 + Y*U + 0*U}{1 - [Y(1-U) + 0*(1-Y-U)]}$$

or $$C_2 = \frac{YU}{1 - Y(1-U)}$$

It is possible to solve this equation for U, and insert it into the equation for $C_1$, thus solving for explicit values of Y and then U. But it is more useful to examine the behavior of this equation before moving to actual solution of both Y and U.

We first solve for U in terms of Y and $C_2$.

$$C_2[1 - Y(1-U)] = YU$$

or $$C_2(1-Y) + C_2 YU = YU$$

or $$Y(1-C_2)U = C_2(1-Y)$$

or $$U = \frac{C_2(1-Y)}{Y(1-C_2)} = \left[\frac{C_2}{1-C_2}\right]\left[\frac{1-Y}{Y}\right].$$

Figure 11:
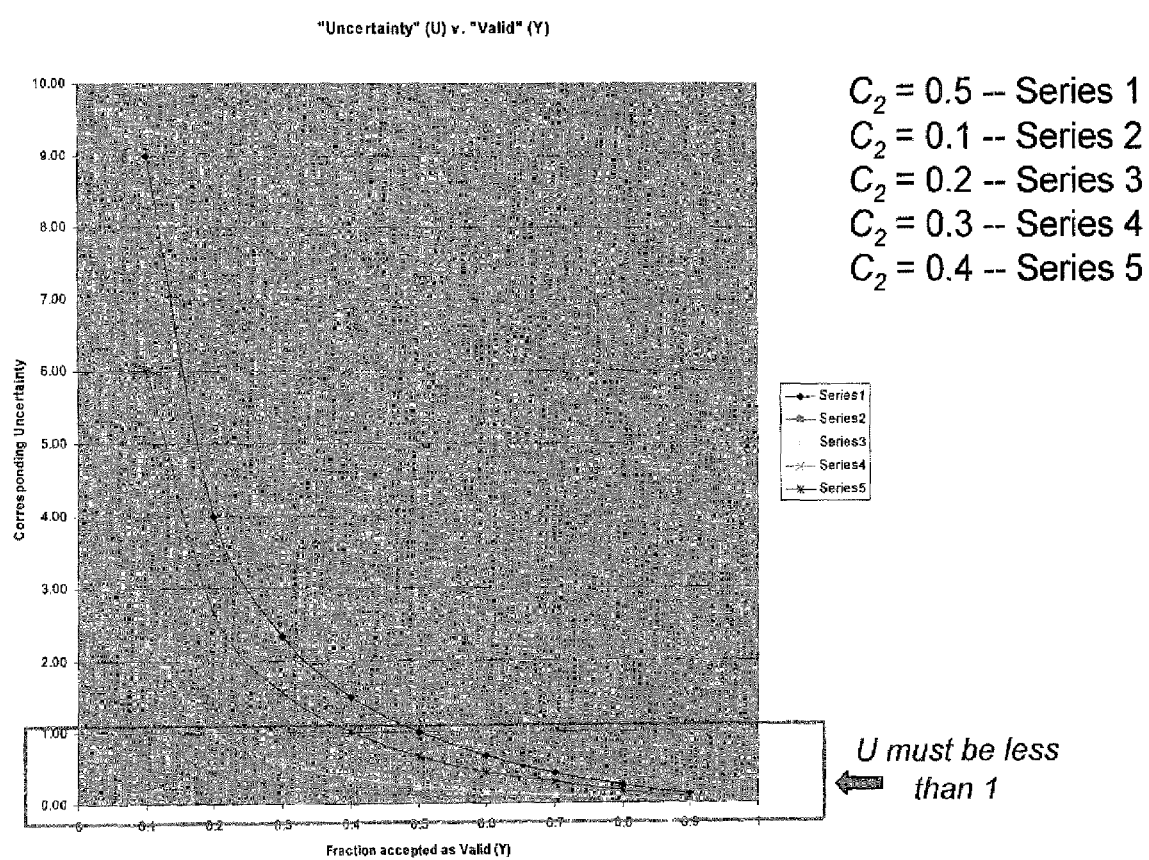
FIG. 11 is a graphical representation of uncertainty as a function of validating an extracted entity according to one embodiment of the invention.

As can be seen from this equation, the uncertainty for the non-corroborating case can now be identified as a constant ($C_2/(1-C_2)$) multiplying a term involving the positive belief FIG. 11 identifies some cases for possible values of Y and the corresponding values for U, for different values of $C_2$.

In FIG. 11, Uncertainty "U" as a function of validating evidence item for a "Yes" belief or "Y", expressed as fraction of whole, shown for the case where one evidence source supports the hypothesis (presents a positive value for "Y"), and the other does not ("Y=0"). For both evidence sources, the uncertainty U is the same.

The graph shown in FIG. 11 gives a basis for examining the potential values for uncertainty (ordinate) as a function of the fraction of initial belief level accepted as belief or as positive evidence (abscissa), for the case where only one evidence source provides a positive or confirming belief value for a given hypothesis, The important points to note are first, although the function is shown for larger values of uncertainty, the true allowable values for both uncertainty (U) and positive belief (Y) are less than or equal to one, in fact, $U+Y \leq 1.$ This means that the acceptable range for U is from 0 to 1 on the ordinate, or LHS.

The various "series" shown in this figure correspond to different values of observed total (D-S) resultant positive belief, or $C_2$, conditioned on the fact that two evidence sources are being combined, one of which has no positive belief at all.

Series 1 shows the case where the final resultant confidence or Bel(Total) is 0.5, resulting from a combination of evidence $E_A$ supporting a positive belief ($M_{EA}(Y)$) and evidence $E_B$ with no positive belief. This Series 1 illustrates the highest of the resultant confidences illustrated in this figure. Initial inspection would suggest that to reach this high confidence level, the $M_{EA}(Y)$ must be greater than or equal to 0.5. But recalling that Y+U+N=1, suggests that even if N is very small, Y=U≦1 must hold, and also, since U≦1 must hold, this presents a hard upper bound on the Series 1-5 curve ranges that can be considered as plausible. This shows that many of the value pair combinations on the Series 1 curve are actually unallowable.

Series 2 presents a different case, with a relatively low resultant belief of $C_2$=0.1. Here, the $E_A$ initial belief value Y can range from relatively high (e.g., 0.9) down to much smaller values. The influence of the disbelief, although not explicit in this Figure, is also a factor: When Y is high (e.g., 0.9), the value of U is small, and N is small in the case of $E_A$ but more substantial in the case of $E_B$.

We can see from this figure that $C_2$=0.3 is about the highest that would be reasonable.

Translated to meaningfulness, the value $C_2$ refers to the combined belief mass resulting from two evidence items; one in support of an assertion, and the other not in support. The calculations just presented show that a likely maximal value for $C_2$ would be about 0,3; this corresponds with intuition that a combined evidence mass would not be very high if there were strong disagreement between the two evidences.

Case 1—Corroborating Evidence

In the case of supportive evidence masses, we address the situation where evidence from two sources supports the same conclusion or belief. This implies certain things.

The evidence mass Y from the two different evidence sources, $M_{EA}(Y)$ and $M_{EB}(Y)$, will be equal, that is $M_{EA}(Y)=M_{EB}(Y)=Y$.

Similarly, the two different evidence sources' uncertainties are equal, $M_{EA}(U)=M_{EB}(U)=U$.

The sum of the evidence masses, for each evidence-type, is 1, so:

$Y+U+N=1$, or $N=1-Y-U$.

The goal now is to identify values of Y and U that will give appropriate behaviors for both Case 1 and Case 2, such that the confidence for the "corroborating" case is one value, and the confidence for the "non-corroborating" case is substantially less than that for the "corroborating" case. This turns out to be intractable for an analytic solution, but would resolve well with a numerical analysis approach.

As an illustration, a cursory approach to numerical analysis identifies that target values of $C_1$=0.3 and $C_2$=0.15 can be approached, suggesting that minor adjustments to the initial assumptions will result in a useful model. Specifically, we can obtain:

$C_1$=0.27 =D-S mass of belief that an assertion is corroborated with two independent forms of evidence, and $C_2$=0.114=D-S mass of belief that an assertion is not corroborated with two independent forms of evidence, These two resultants can be reached using the following values for D-S beliefs:

Y=0.3=Evidence mass (from one evidence source) supporting belief in the match,

U=0.3=Uncertainty that there is a match, and

N=0.4=Evidence mass (from the same evidence source) supporting disbelief in the match.

The reason that the resultant confidences or Bel(Total) values $C_1$ and $C_2$ are so low is that the initial disbelief values are relatively high; smaller disbeliefs and larger values for belief result in higher values for $C_1$ and $C_2$.

Analytic forward-generation of evidence aggregation, starting with specific different belief/disbelief evidence combinations, yields a "space" which can then be examined (or interpolated) to find workable distributions for initial evidence belief/disbelief values.

While examples such as the one just presented provide specific variable combinations leading to specifiable results, this does not in itself guarantee that the variable combinations correspond to what is likely from the data sources; instead, this provides a means for assessing the parameter space so that the behaviors and interactions of various parameter combinations can be assessed.

For example, a much higher value for $C_1$ can be obtained by greatly increasing the value of Y, e.g., using the parameter set Y=0.8=Evidence mass (from one evidence source) supporting belief in the match, U=0.17=Uncertainty that there is a match, and N=0.03=Evidence mass (from the same evidence source) supporting disbelief In This case, we obtain $C_1$=0.955 and $C_2$=0.405. This illustrates that when belief values from a given evidence source are relatively high (and disbeliefs and uncertainties are low), it is possible for lack of positive evidence from any evidence source can dramatically reduce the resultant combined total belief, while combined positive beliefs yield a substantial increase in overall belief value.

Through exhaustive computation of various evidence combinations, along with the partial evidence values that will be allocated if partial evidence (or partially confirming) is presented, it is possible to exhaustively map a space identifying the resultant belief, plausibility, disbelief, and other values that will result after each evidence item is added.

For each specific application, it is important to work out the maximal possible evidence accrual cases (e.g., maximal belief contributed by multiple sources), and to verify that this final result would be appropriate considering both known observations across statistically large sample sets as well as a "common sense" test in the believability of the final results. Similarly, it is important to run other "boundary case" data sets and ascertain that the final resultant combination would be within expectations Further, the order in which the results are accrued is important, especially in terms of making decisions about when to stop collecting more evidence. Thus, at the same time that evidence values (i.e., belief, uncertainty, disbelief) are being determined for each specific type of evidence that can be contributed, along with the values for partial evidence, it is also important to determine the various threshold values that would be set in association with evidence accrual and decision-making. At times, it may be useful to "work in reverse," i.e., determine what thresholds would be desirable or sensible, and ensure that given certain evidence types with sufficient degrees of completeness for each, so that the feed forward process of evidence accrual would yield the desired results.

Also, it is important to consider both the types and the order in which evidence will be accrued, according to the Rule Set Ω as first described in the Detailed Description of this invention. Typically, the first evidence items to be accrued are those that are:

- Most likely to contribute positive beliefs for hypothesis validation (or disbeliefs, for the case of hypothesis refutation),
- Have the greatest likelihood of being available when sought for accrual from one of the databases or evidence sources available, and
- Are least expensive, given that the first two criteria are satisfied.

These initial evidence items will typically be combined in a pre-specified order At the end of this first evidence-gathering process, typically followed by a resolution cycle (again as first described in the Detailed Description of this invention), there will sometimes be need for additional evidence accrual in order to cross decision-making thresholds. In this case, it is likely that there will be a choice among the different kinds of evidence that could be sought for this next step, (Refer to FIG. 1.)

At this point, it is reasonable to engage another Rules Set Ω', whose purpose it would be to identify the next selection of evidence items. It is useful to develop the rules set based on an optimization study of which evidence items are most likely to provide the requisite incremental belief (or disbelief) goals at least cost. Such Rule Sets would be highly specific to a given application.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A system for performing evidence-based decision-making comprising:
   an evidence processor, configured to match an extracted entity against a set of reference entities;
   an evidence selection processor for defining a rule set to be applied to the extracted entity and the plurality of reference entities and configured to generate a total evidence function;
   a threshold processor configured to generate a context-dependent threshold for an acceptable decision, wherein the acceptable decision is achieved when a value of the total evidence function exceeds a predetermined threshold value; and
   a decision processor, configured to compare the total evidence function to the context-dependent threshold and determine whether to accumulate and aggregate further evidence or to generate a decision-result; and
   wherein the system provides a degree of validation or refutation of the extracted entity matching one or more of the set of reference entities.

2. A system for performing evidence-based decision-making as claimed in claim 1, wherein the evidence processor is configured to further accumulate and aggregate a set of enhanced reference entities against which each of the extracted entity will be matched; and further comprising one or more data sources, configured to enhancements in the form of either feature vector elements and/or corrections to feature vector elements for either or both the reference entities and the extracted entities, thereby generating a plurality of augmented feature vectors for each of the plurality of extracted entities and/or the reference entities.

3. A system for performing evidence-based decision-making as claimed in claim 1, wherein the evidence selection processor further comprises:
   a hypothesis generator configured to generate one or more hypotheses about the extracted entity; and
   a hypothesis validation processor configured to validate, refute and/or eliminate the generated hypotheses to generate a total evidence function which is computed uniquely and distinctively for each hypothesis regarding a potential match between an extracted entity and a reference entity.

4. A system for performing evidence-based decision-making as claimed in claim 3, wherein the rule set is used both by the hypothesis generator to generate a plurality of hypotheses and by the hypothesis validation processor to gather data to validate or refute the generated hypotheses.

5. A system for performing evidence-based decision-making as claimed in claim 1, wherein the threshold processor is further configured to: use the rule set to define the context-dependent threshold for an acceptable decision using a potentiality calculation and plausibility calculation.

6. A system for performing evidence-based decision-making, as claimed in claim 1, further comprising:
   a reconciliation processor, configured to:
      acquire additional evidence from the one or more data sources, according to the rule set provided by the evidence selection processor, for the extracted entity and each of its associated hypothetical matches to a reference entity or enhanced reference entity;
      evaluate the hypothetical matches and determine if additional evidence is required to evaluate the hypothetical matches; and
   a second evidence processor by which the additional evidence is aggregated with the existing evidence associated with the extracted entity, forming an expanded feature vector set uniquely associated with the extracted entity.

7. A system for performing evidence-based decision-making as claimed in claim 1, wherein the evidence processor is configured to accumulate evidence so that the evidence is traceable.

8. A system for performing evidence-based decision-making as claimed in claim 1, wherein each of the extracted entities and reference entities further comprise a plurality of feature vectors.

9. A system for performing evidence-based decision-making as claimed in claim 8, wherein at least one of the feature vectors of the reference entities is not fully populated with a plurality of element values.

10. A system for performing evidence-based decision-making as claimed in claim 8, wherein some and/or each of the plurality of feature vectors comprises a plurality of vector elements.

11. A system for performing evidence-based decision-making as claimed in claim 8, wherein the evidence processor is configured to obtain additional element values for the plurality of reference entity feature vectors.

12. A system for performing evidence-based decision-making from a set of data elements comprising:
   a plurality of extracted entities about which a decision will be made for each extracted entity, wherein each extracted entity has associated with it a plurality of feature vectors each having a plurality of feature vector elements;
   a set of reference entities against which each of the plurality of extracted entities will be matched;
   a set of enhanced reference entities against which each of the plurality of extracted entities will be matched;
   one or more data sources, configured to enhancements in the form of either feature vector elements and/or corrections to feature vector elements for either or both the reference entities and the extracted entities, thereby generating a plurality of augmented feature vectors for each of the plurality of extracted entities and/or the reference entities;
   an evidence processor, configured to compare the plurality of augmented feature vectors associated with each of the plurality of extracted entities against a plurality of feature vectors for the set of reference entities or the set of enhanced reference entities; and
   a threshold processor configured to generate a context-dependent threshold for an acceptable decision,
   wherein the system provides a degree of validation or refutation of the extracted entity matching one or more of the set of reference entities.

13. A system for performing evidence-based decision-making from a set of data elements as claimed in claim 1, further comprising an evidence selection processor for defining a plurality of rule sets to be applied to each of the plurality of extracted entities and the plurality of reference entities and configured to generate the initial set of extracted entities.

14. A system for performing evidence-based decision-making from a set of data elements as claimed in claim 13, wherein the evidence selection processor further comprises:
   a hypothesis generator configured to generate one or more hypotheses about each of the plurality of extracted entities; and
   a hypothesis validation processor configured to validate, refute and/or eliminate the generated hypotheses to generate the initial set of extracted entities.

15. A system for performing evidence-based decision-making as claimed in claim 14, wherein the rule set is used both by the hypotheses generator to generate a plurality of hypotheses and by the evidence processor to gather data to validate or refute the generated hypotheses.

16. A system for performing evidence-based decision-making as claimed in claim 12, wherein the threshold processor is further configured to: use the rule set to define the context-dependent threshold for an acceptable decision using a potentiality calculation and plausibility calculation.

17. A system for performing evidence-based decision-making from a set of data elements, as claimed in claim 12, wherein the set of enhanced reference entities include various permutations of the plurality of reference entities, and wherein the set of enhanced reference entities is larger than and inclusive of the set of reference entities.

18. A system for performing evidence-based decision-making from a set of data elements, as claimed in claim 13, wherein the rule set is derived by performing a multidimensional lookup task and characterizing the plurality of vector elements of the plurality of feature vectors against normative values.

19. A system for performing evidence-based decision-making from a set of data elements, as claimed in claim 13, further comprising:
   a reconciliation processor, configured to acquire additional evidence from the one or more data sources, according to the rule set provided by the evidence selection processor, for each member of the candidate positive pool and each of its associated hypothetical matches to a reference entity or enhanced reference entity;
   a second evidence processor by which the additional evidence is aggregated with the existing evidence associated with a candidate positive entity, forming an expanded feature vector set uniquely associated with that candidate positive entity, and
   a decision processor, configure to apply an evaluation to the new feature vector associated with a given candidate positive entity, to further refine the previous decision as to whether the candidate positive is a definite match, a definite not-match, or requires more evidence for hypothesis refutation regarding its hypothesized match against a enhanced reference entity or a reference entity.

20. A system for performing evidence-based decision-making comprising:
   an evidence processor, configured to compare a plurality of augmented feature vectors associated with each of a plurality of extracted entities against a plurality of feature vectors for a set of reference entities or a set of enhanced reference entities; and
   a threshold processor configured to generate a context-dependent threshold for an acceptable decision, wherein the acceptable decision is achieved when a value of a total evidence function exceeds a predetermined threshold value,
   wherein the system provides a degree of validation or refutation of the extracted entity matching one or more of the set of reference entities.

21. A system for performing evidence-based decision-making as claimed in claim 20, further comprising one or more data sources, configured to provide data for the set of reference entities and the set of enhanced reference entities in order to augment the plurality of feature vectors associated with each of the plurality of extracted entities, thereby generating a plurality of augmented feature vectors for each of the plurality of extracted entities.

22. A system for performing evidence-based decision-making as claimed in claim 20, further comprising:
   a reconciliation processor, configured to acquire additional evidence from the one or more data sources, according to the rule set provided by the evidence selection processor, for each member of the initial set of extracted entities and each of its associated hypothetical matches to a reference entity or enhanced reference entity;
   a second evidence processor by which the additional evidence is aggregated with the existing evidence associated with the extracted entity, forming an expanded feature vector set uniquely associated with that extracted entity, and
   a decision processor, configure to apply an evaluation to the new feature vector associated with the extracted entity, to further refine the previous decision as to whether the candidate positive is a definite match, a definite not-match, or requires more evidence for hypothesis refutation regarding its hypothesized match against a enhanced reference entity or a reference entity.

23. A system for performing evidence-based decision-making from a set of data elements as claimed in claim 20, further comprising an evidence selection processor for defining a rule set to be applied to the extracted entity and the plurality of reference entities and configured to generate an initial set of extracted entities.

24. A system for performing evidence-based decision-making from a set of data elements as claimed in claim 23, wherein the evidence selection processor further comprises:
a hypothesis generator configured generate one or more hypotheses about the extracted entity; and
a hypothesis validation processor configured to validate, refute and/or eliminate the generated hypotheses to generate an initial set of extracted entities.

25. A system for performing evidence-based decision-making as claimed in claim 23, wherein the rule set is used both by the hypotheses generator to generate a plurality of hypotheses and by the evidence processor to gather data to validate or refute the generated hypotheses.

26. A system for performing evidence-based decision-making from a set of data elements, as claimed in claim 23, wherein the rule set is derived by performing a multidimensional lookup task and characterizing the plurality of vector elements of the plurality of feature vectors against normative values.

27. A system for performing automated security screening using evidence-based decision-making comprising:
an evidence processor, configured to match an extracted entity against a set of reference entities;
an evidence selection processor for defining a rule set to be applied to the extracted entity and the plurality of reference entities and configured to generate a total evidence function;
a threshold processor configured to generate a context-dependent threshold for an acceptable decision; and
a decision processor, configured to compare the total evidence function to the context-dependent threshold and determine whether to accumulate and aggregate further evidence or to generate a decision,
wherein the system provides a degree of validation or refutation of the extracted entity matching one or more of the set of reference entities.

28. A system for performing evidence-based decision-making as claimed in claim 27, wherein for each extracted entity there exists a primary information vector, an activity vector and a context vector.

29. A system for performing evidence-based decision-making as claimed in claim 27, wherein the primary information vector consists of personal information, including but not limited to a name and a date of birth of the extracted entity.

30. A system for performing evidence-based decision-making as claimed in claim 27, wherein the activity vector may include flight information, public appearance information and/or statement information.

31. A system for performing evidence-based decision-making as claimed in claim 27, wherein the context vector includes but is not limited to contextual information related to the information contained in the activity vector.

32. A system for performing evidence-based decision-making comprising a processor configured to:
match an extracted entity against a set of reference entities;
define a rule set to be applied to the extracted entity and the plurality of reference entities and configured to generate a total evidence function;
generate a context-dependent threshold for an acceptable decision, wherein the context-dependent threshold is a function of a potentiality and plausibility value; and
compare the total evidence function to the context-dependent threshold and determine whether to accumulate and aggregate further evidence or to generate a decision-result,
wherein the system provides a degree of validation or refutation of the extracted entity matching one or more of the set of reference entities.

33. A system for performing evidence-based decision-making as claimed in claim 32, wherein the potentiality value is independent of any information about the extracted entity and is a measure representative of a need to obtain more information about the extracted entity.

34. A system for performing evidence-based decision-making as claimed in claim 32, wherein the plausibility value is a degree to which it is credible that a given assertion could possibly be true.

35. A method for performing evidence-based decision-making comprising the steps of:
matching an extracted entity against a set of reference entities;
defining a rule set to be applied to the extracted entity and the plurality of reference entities and configured to generate a total evidence function;
generating a context-dependent threshold for an acceptable decision, wherein the acceptable decision is achieved when a value of the total evidence function exceeds a predetermined threshold value;
comparing the total evidence function to the context-dependent threshold and determine whether to accumulate and aggregate further evidence or to generate a decision-result; and
providing a degree of validation or refutation of the extracted entity matching one or more of the set of reference entities.

36. A method for performing evidence-based decision-making from a set of data elements comprising the steps of:
identifying a plurality of extracted entities about which a decision will be made for each extracted entity, wherein each extracted entity has associated with it a plurality of feature vectors each having a plurality of feature vector elements;
identifying a set of reference entities against which each of the plurality of extracted entities will be matched;
identifying a set of enhanced reference entities against which each of the plurality of extracted entities will be matched;
generating a plurality of augmented feature vectors for each of the plurality of extracted entities and/or the reference entities from one or more data sources, configured to enhancements in the form of either feature vector elements and/or corrections to feature vector elements for either or both the reference entities and the extracted entities, thereby;
comparing the plurality of augmented feature vectors associated with each of the plurality of extracted entities against a plurality of feature vectors for the set of reference entities or the set of enhanced reference entities; and
generating a context-dependent threshold for an acceptable decision,
providing a degree of validation or refutation of the extracted entity matching one or more of the set of reference entities.

37. A method for performing evidence-based decision-making comprising the steps of:
comparing a plurality of augmented feature vectors associated with each of a plurality of extracted entities against a plurality of feature vectors for a set of reference entities or a set of enhanced reference entities; and generating a context-dependent threshold for an acceptable decision, wherein the acceptable decision is achieved when a value of a total evidence function exceeds a predetermined threshold value, providing a degree of validation or refutation of the extracted entity matching one or more of the set of reference entities.

38. A method for performing automated security screening using evidence-based decision-making comprising the steps of:

matching an extracted entity against a set of reference entities;

defining a rule set to be applied to the extracted entity and the plurality of reference entities and configured to generate a total evidence function;

generating a context-dependent threshold for an acceptable decision; and comparing the total evidence function to the context-dependent threshold and determine whether to accumulate and aggregate further evidence or to generate a decision, providing a degree of validation or refutation of the extracted entity matching one or more of the set of reference entities.

* * * * *